United States Patent
Okawa et al.

(10) Patent No.: US 8,907,601 B2
(45) Date of Patent: Dec. 9, 2014

(54) BRAKING APPARATUS FOR A VEHICLE

(71) Applicant: Aisin Seiki Kabushiki Kaisha, Kariya (JP)

(72) Inventors: Akemi Okawa, Chita-gun (JP); Masanori Mori, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 170 days.

(21) Appl. No.: 13/726,407

(22) Filed: Dec. 24, 2012

(65) Prior Publication Data

US 2013/0162181 A1    Jun. 27, 2013

(30) Foreign Application Priority Data

Dec. 26, 2011    (JP) .................................. 2011-284478

(51) Int. Cl.
*H02P 3/20*        (2006.01)
*B60L 7/14*        (2006.01)

(52) U.S. Cl.
CPC .............. *B60L 7/14* (2013.01); *B60L 2220/44* (2013.01); *H02P 3/20* (2013.01)
USPC ............................ 318/373; 318/375; 318/376

(58) Field of Classification Search
CPC ....................................................... H02P 3/20
USPC .......................................... 318/373, 375, 376
See application file for complete search history.

(56) References Cited

U.S. PATENT DOCUMENTS

| 8,143,824 B2 * | 3/2012 | Mitsuda et al. ............... 318/376 |
| 2009/0166111 A1 | 7/2009 | Mizutani et al. |

FOREIGN PATENT DOCUMENTS

| JP | 11-004504 A | 1/1999 |
| JP | 11-234804 A | 8/1999 |
| JP | 2003-287069 A | 10/2003 |
| JP | 2004-187445 A | 7/2004 |
| JP | 2007-106385 A | 4/2007 |
| JP | 2007-196904 A | 8/2007 |

* cited by examiner

*Primary Examiner* — David S Luo
(74) *Attorney, Agent, or Firm* — Buchanan Ingersoll & Rooney PC

(57) ABSTRACT

A braking apparatus for a vehicle includes a permanent magnet synchronous motor including a rotor having a permanent magnet, and a stator capable of driving the rotor to rotate and configured to couple the rotor to each of at least a pair of wheels of the vehicle; a power accumulating portion that accumulates power to be supplied to the permanent magnet synchronous motor; a conversion control portion that converts the power of the power accumulating portion to excite the stator and control the rotation of the rotor; and an in-phase excitation control portion that applies exciting brake to the wheel by exciting the stator by supplying power in the same phase as the excitation with respect to the stator in the direction of rotation of the rotor according to the control performed by the conversion control portion, wherein the wheel is stopped by the exciting brake.

14 Claims, 15 Drawing Sheets

BRAKING APPARATUS FOR A VEHICLE

CROSS REFERENCE TO RELATED APPLICATION

This application is based on and claims priority under 35 U.S.C. §119 to Japanese Patent Application 2011-284478, filed on Dec. 26, 2011, the entire content of which is incorporated herein by reference.

TECHNICAL FIELD

This disclosure relates to a braking apparatus for a vehicle and, more specifically, to a braking apparatus for a vehicle configured to stop the rotation of wheels by an electric motor.

BACKGROUND DISCUSSION

Examples of braking apparatuses for a vehicle generally include hydraulic brake equipment configured to apply a hydraulic brake. However, in electric motor vehicles or so-called hybrid motor vehicles in recent years, a regenerative brake using an electric motor is used. For example, a braking force control apparatus configured to generate allowance margins of motor torque for both the regenerating side and the power running side to enlarge a control width of the motor torque is disclosed in JP-2007-106385A (Reference 1). In JP-11-4504A (Reference 2), collaborative control of the regenerative brake and the hydraulic brake is performed. In contrast, in JP-2003-287069A (Reference 3), electric motor brake equipment configured to convert a rotary motion of an electric motor into a translatory motion to propel a piston and press a friction pad against a disk rotor to generate a braking force is disclosed. In this manner, the braking apparatus for a vehicle provided with an electric motor for driving employs also the frictional brake using a mechanical braking portion such as the hydraulic brake equipment or the electric motor brake equipment described above in addition to the regenerative brake (regenerative brake) by the electric motor.

In addition, in JP-2004-187445A (Reference 4), applying a brake by exciting the motor to rotate in the reverse direction is proposed. However, it is a general braking portion in an induction motor using no permanent magnet, and is employed in railway vehicles. In other words, in the railway vehicles (electric vehicles), since stopping is achieved only by the induction motor, a control apparatus for electric vehicles configured to apply a pure electric brake or an all-electric brake by applying an electric brake or a stop brake in addition to the regenerative brake is proposed, and braking on the basis of reverse-phase driving is employed in addition to the regenerative brake. For example, in JP-11-234804A (Reference 5), a reverse-phase electric brake configured to obtain a braking force by speed reduction and also by switching to reverse power running by a forward brake is disclosed. However, the frictional brake is still in combination use in actual railway vehicles, and, for example, an air brake system is also mounted.

As the braking apparatuses for electric motor vehicles or hybrid motor vehicles described above, a permanent magnet synchronous motor including a rotor having a permanent magnet and a stator configured to allow the rotor to be driven to rotate, and the rotor being coupled to respective wheels of the vehicle, and a power accumulating portion such as a battery configured to supply power to the permanent magnet synchronous motor to excite the stator are provided and configured to inhibit the rotation of the wheels by the permanent magnet synchronous motor and, more specifically, an embedded permanent magnet field synchronous motor (referred to as IPM) having the permanent magnet embedded into the rotor is used. Furthermore, an in-wheel motor (referred to as IWM) including the rotor and the stator of the electric motor accommodated in the wheel of the wheel is also proposed. Such an in-wheel motor, being disclosed in JP-2007-196904A (Reference 6), also employs the frictional brake in combination, and the wheel includes a hydraulic frictional brake equipment mounted thereon in addition to the electric motor.

As described above, a technology which allows the vehicle to stop only by the induction motor is focused in the railway vehicles (electric vehicles). However, in the electric motor vehicles or the hybrid motor vehicles, the frictional brake on the basis of the hydraulic fictional brake equipment is used in combination with the regenerative brake on the basis of the permanent magnet synchronous motor. Therefore, the hydraulic frictional brake equipment is essential also in the in-wheel motor in order to bring the wheels into a stop state. This may impair reduction in unsprung weight, and also impairs practical application of the in-wheel motor. In recent years, in the motor vehicles, a large cabin space such as a riding space or a luggage space is required. In the motor-driven electric motor vehicles, if a compact high-torque motor is developed in the future, reduction in diameter of the wheels is enabled, and enlargement of the cabin space is enabled correspondingly. However, as described above, since the frictional brake equipment arranged in the wheel is an essential configuration in the motor-driven vehicles in the related art, a problem that the frictional brake equipment impairs the reduction in diameter of the wheels exists.

A need thus exists for a braking apparatus for a vehicle configured to inhibit the rotation of wheels by an electric motor, in which the rotation of the wheels is inhibited only by controlling the electric motor, and a smooth and reliable braking force may be applied until the wheels are brought into a stop state without necessity of a frictional brake equipment.

SUMMARY

In order to solve the above-described problems, according to a first aspect of the embodiment disclosed here, there is provided a braking apparatus for a vehicle including: a permanent magnet synchronous motor including a rotor having a permanent magnet, and a stator capable of driving the rotor to rotate and configured to couple the rotor to each of at least a pair of wheels of the vehicle; a power accumulating portion configured to accumulate power to be supplied to the permanent magnet synchronous motor; a conversion control portion configured to convert the power of the power accumulating portion to excite the stator and control the rotation of the rotor; an in-phase excitation control portion configured to apply exciting brake to the wheel by exciting the stator by supplying power in the same phase as the excitation with respect to the stator in the direction of rotation of the rotor according to the control performed by the conversion control portion, wherein the wheel is stopped by the exciting brake.

DETAILED DESCRIPTION

Figure 1:
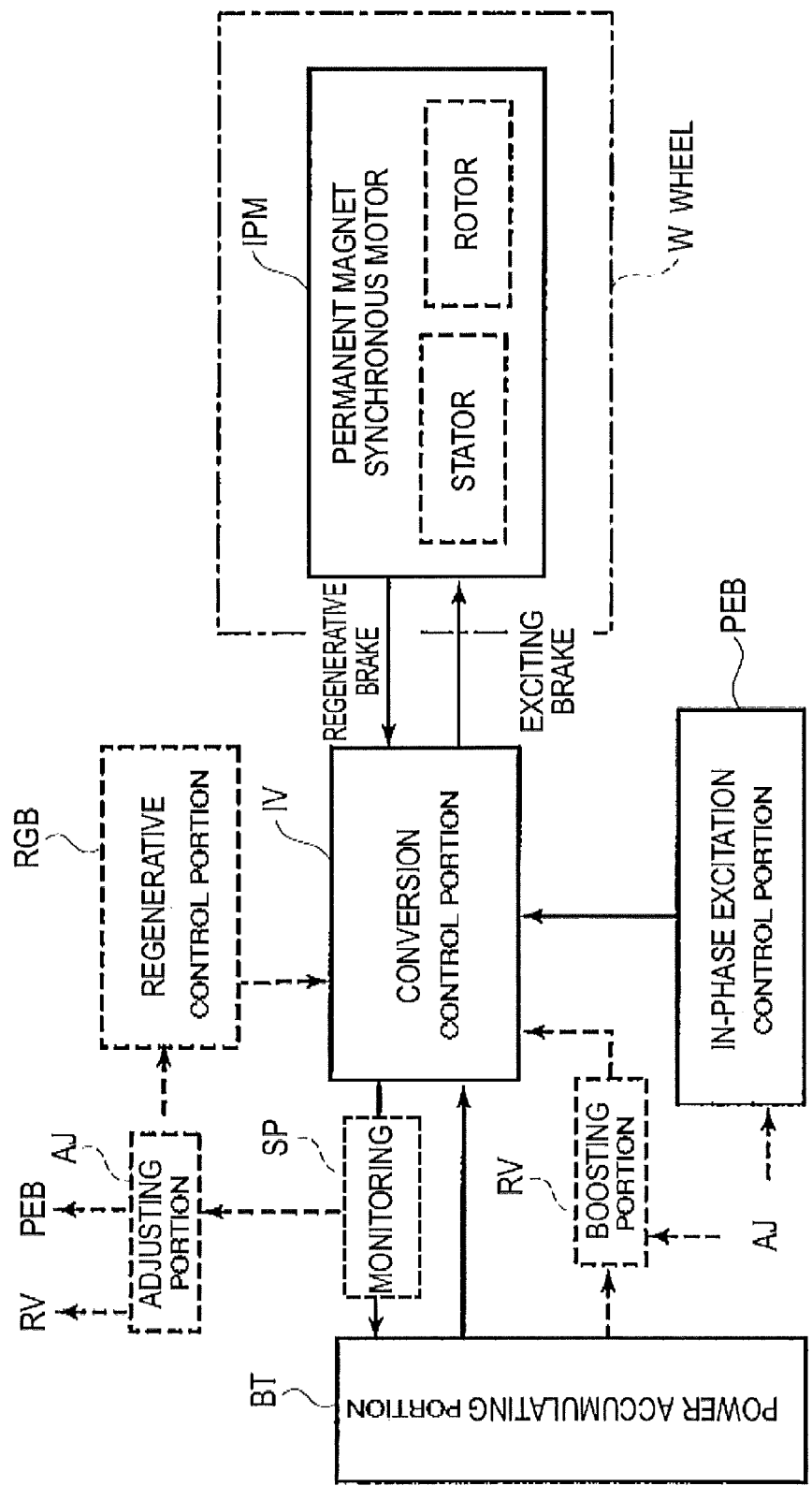
FIG. 1 is a block diagram illustrating a principal configuration of a braking apparatus of an embodiment disclosed here.

According to a first aspect of the embodiment disclosed here, there is provided a braking apparatus for a vehicle including: a permanent magnet synchronous motor including a rotor having a permanent magnet, and a stator capable of driving the rotor to rotate and configured to couple the rotor to each of at least a pair of wheels of the vehicle; a power accumulating portion configured to accumulate power to be supplied to the permanent magnet synchronous motor; a conversion control portion configured to convert the power of the power accumulating portion to excite the stator and control the rotation of the rotor; an in-phase excitation control portion configured to apply exciting brake to the wheel by exciting the stator by supplying power in the same phase as the excitation with respect to the stator in the direction of rotation of the rotor according to the control performed by the conversion control portion, wherein the wheel is stopped by the exciting brake.

With the configuration as described above, the embodiment disclosed here achieves the following advantages. In other words, in the apparatus according to the first aspect of the embodiment disclosed here, since the permanent magnet synchronous motor is controlled by the in-phase excitation control portion at the time of braking of the vehicle, and the stator is excited in the same phase as excitation of the stator in the direction of rotation of the rotor according to the control of the conversion control portion to apply the exciting brake with respect to the wheel, a large braking force substantially equivalent to the output from the permanent magnet synchronous motor in the driven state is generated. Therefore, the braking force equivalent to a high-rotation area may be generated in a low-rotation area of the wheel as well without necessity of the friction brake system, so that the vehicle may be stopped smoothly and reliably. Consequently, reduction in size and weight of the entire braking apparatus is enabled, and a fuel efficiency is improved.

The braking apparatus according to a second aspect of the embodiment disclosed here preferably includes a regenerative control portion configured to accumulate a regenerative power generated in the permanent magnet synchronous motor by the rotation of the wheel in the power accumulating portion via the conversion control portion and apply a regenerative brake to the wheel, and the rotation of the wheel is inhibited by the regenerative brake and the wheel is stopped by the exciting brake.

With the configuration of the braking apparatus as the second aspect of the embodiment disclosed here, since the regenerative power may be utilized to inhibit the rotation of the wheel by the regenerative brake and cause the wheel to stop reliably by the exciting brake, effective energy utilization is achieved.

In the braking apparatus according to the third aspect of the embodiment disclosed here, it is preferable that at least the rotor and the stator which constitute the permanent magnet synchronous motor are accommodated in a wheel which constitutes the wheel to constitute an in-wheel motor.

In particular, with the in-wheel motor as the third aspect of the embodiment disclosed here, further reduction in size and weight of the entire braking apparatus is enabled.

In the braking apparatus according to a fourth aspect, it is preferable that the permanent magnet synchronous motor is mounted on each one of all the wheels of the vehicle, and the exciting brake is applied to each of the wheels by the in-phase excitation control portion.

With the configuration as the fourth aspect of the embodiment disclosed here, since the exciting brake may be applied to each of all of the traveling vehicles, operation control of the vehicle by complex braking force control is facilitated.

The braking apparatus according to a fifth aspect of the embodiment disclosed here preferably includes a power monitoring portion configured to monitor the regenerative power; and an adjusting portion configured to adjust a switching timing from the regenerative brake applied by the regenerative control portion to the exciting brake applied by the in-phase excitation control portion on the basis of the difference between the regenerative power detected by the power monitoring portion and the required braking force with respect to the wheel, and the wheel is stopped by the exciting brake at the switching timing adjusted by the adjusting portion after the inhibition of the rotation of the wheel by the regenerative brake.

With the configuration as the fifth aspect of the embodiment disclosed here, stopping of the wheel is achieved by the exciting brake at an adequate switching timing after having inhibited the rotation of the wheel by the regenerative brake.

The braking apparatus according to a sixth aspect of the embodiment disclosed here preferably includes a boosting portion configured to boost the power of the power accumulating portion, and the power boosted by the boosting portion is supplied to the conversion control portion to excite the stator at the switching timing to the exciting brake adjusted by the adjusting portion.

Furthermore, with the configuration as the sixth aspect of the embodiment disclosed here, since a large braking force is secured by the exciting brake, the operation control of the vehicle is facilitated.

In order to solve the above-described problem, according to a seventh aspect of the embodiment disclosed here, there is provided a braking apparatus for a vehicle including: an electric motor including a rotor integrally rotatable with a wheel; and a stator capable of driving the rotor to rotate and configured to receive a supply of power from a power supply portion; and a control portion configured to control the power supplied from the power supply portion to the electric motor and control the rotation of the electric motor, wherein the control portion controls the energization of the electric motor to be a first energization order pattern in the rotation of the electric motor in one direction, controls the energization of the the electric motor to be a second energization order pattern in the rotation of the electric motor in the other direction, is capable of performing a first control which causes the torque to be generated so as to apply a force to the electric motor in the direction of rotation thereof and the second control which causes the torque to be generated so as to prevent the force of the electric motor in in the direction of rotation thereof in the first and second energization order patterns respectively when supplying the power from the power supply portion to the electric motor, and includes an exciting portion configured to inhibit the rotation of the rotor and apply the exciting brake to the wheel by performing the second control in the first and second energization order patterns respectively when supplying the power from the power supply portion to the electric motor, so that the wheel is stopped by the exciting brake.

With the configuration as a seventh aspect of the embodiment disclosed here, since the electric motor is controlled by the exciting portion at the time of braking of the vehicle, and the electric motor is caused to generate a torque to prevent a force in the direction of rotation to apply the exciting brake with respect to the wheel, a large braking force substantially equivalent to the electric motor in the driven state is generated. Therefore, the braking force equivalent to the high rotation area may be generated in the low-rotation area of the wheel as well without necessity of the friction brake system, so that the vehicle may be stopped smoothly and reliably. Consequently, the reduction in size and weight of the entire braking apparatus is enabled, and the fuel efficiency is improved.

The braking apparatus according to an eighth aspect of the embodiment disclosed here preferably includes a regenerative control portion configured to accumulate a regenerative power generated in the electric motor by the rotation of the wheel in the power supply portion via the control portion and apply a regenerative brake to the wheel, and the rotation of the wheel is inhibited by the regenerative brake and the wheel is stopped by the exciting brake.

With the configuration of the braking apparatus as the eighth aspect of the embodiment disclosed here, since the regenerative power may be utilized to inhibit the rotation of the wheel by the regenerative brake and cause the wheel to stop reliably by the exciting brake, effective energy utilization is achieved.

In the braking apparatus according to a ninth aspect of the embodiment disclosed here, it is particularly preferable that at least the rotor and the stator which constitute the electric motor are accommodated in a wheel which constitutes the wheel to constitute an in-wheel motor.

In particular, with the in-wheel motor as the ninth aspect of the embodiment disclosed here, further reduction in size and weight of the entire braking apparatus is enabled.

In the braking apparatus according to a tenth aspect of the embodiment disclosed here, it is further preferable that the electric motor is mounted on each one of all the wheels of the vehicle, and the exciting brake is applied to each of the wheels by the excitation control portion.

With the configuration as the tenth aspect of the embodiment disclosed here, since the exciting brake may be applied to each of all of the traveling vehicles, operation control of the vehicle by complex braking force control is facilitated.

The braking apparatus according to an eleventh aspect of the embodiment disclosed here preferably includes a power monitoring portion configured to monitor the regenerative power; and an adjusting portion configured to adjust a switching timing from the regenerative brake applied by the regenerative control portion to the exciting brake applied by the in-phase excitation control portion on the basis of the difference between the regenerative power detected by the power monitoring portion and the required braking force with respect to the wheel, and the wheel is stopped by the exciting brake at the switching timing adjusted by the adjusting portion after the inhibition of the rotation of the wheel by the regenerative brake.

With the configuration as the eleventh aspect of the embodiment disclosed here, stopping of the wheel is achieved by the exciting brake at an adequate switching timing after having inhibited the rotation of the wheel by the regenerative brake.

The braking apparatus according to a twelfth aspect of the embodiment disclosed here preferably includes a boosting portion configured to boost the voltage of the power supply portion, and the power boosted by the boosting portion is supplied to the conversion control portion to excite the stator at the switching timing to the exciting brake adjusted by the adjusting portion.

Furthermore, with the configuration as the twelfth aspect of the embodiment disclosed here, since a large braking force is secured by the exciting brake, the operation control of the vehicle is facilitated.

In the braking apparatus according to a thirteenth aspect of the embodiment disclosed here, it is preferable that the permanent magnet synchronous motor is configured to drive the wheel.

In addition, with the configuration of the electric motor as the thirteenth aspect of the embodiment disclosed here, driving and control of the wheel are also enabled by the electric motor, so that reduction in number of components and reduction in size are achieved in the vehicle.

In the braking apparatus according to a fourteenth aspect of the embodiment disclosed here, it is preferable that the electric motor is configured to drive the wheel.

In addition, with the configuration of the electric motor as the fourteenth aspect of the embodiment disclosed here, driving and control of the wheel are also enabled by the electric motor, so that reduction in number of components and reduction in size are achieved in the vehicle.

Referring now to the drawings, preferred embodiments disclosed here will be described. FIG. 1 illustrates a general configuration of a braking apparatus for a vehicle according to an embodiment disclosed here, in which an embedded permanent magnet field synchronous motor IPM (hereinafter, referred to simply as "permanent magnet synchronous motor IPM") includes a rotor having a permanent magnet (not illustrated) and a stator capable of driving the rotor to rotate as designated by broken lines, and the rotor is coupled to a wheel of a wheel (designated by W in FIG. 1) so as to rotate integrally. In FIG. 1, the rotor and the stator of the permanent magnet synchronous motor IPM are accommodated in the wheel W, and constitute an in-wheel motor (referred to as IWM).

In addition, a power accumulating portion BT such as a battery configured to accumulate power to be supplied to the permanent magnet synchronous motor IPM and a conversion control portion IV such as an inverter configured to excite the stator by converting the power of the power accumulating portion BT to control the rotation of the rotor are provided. Furthermore, an in-phase excitation control portion PEB is provided so that the stator is excited to the same phase as excitation of the stator in the direction of rotation of the rotor according to the control of the conversion control portion IV to apply exciting brake with respect to the wheel W and stop the wheel.

In addition to the components described above, as designated by broken lines in FIG. 1, a regenerative control portion RGB may be configured to accumulate a regenerative power generated in the permanent magnet synchronous motor IPM by the rotation of the wheel W in the power accumulating portion BT via the conversion control portion IV and apply a regenerative brake to the wheel W, so that the rotation of the wheel W (and hence the wheel) is inhibited by the regenerative brake and the wheel W (and hence the wheel) is stopped by the exciting brake.

Then, a power monitoring portion SP configured to monitor the regenerative power and an adjusting portion AJ configured to adjust a switching timing from the regenerative brake by the regenerative control portion RGB to the exciting brake by the in-phase excitation control portion PEB on the basis of the difference between the regenerative power detected by the power monitoring portion SP and a required braking force with respect to the wheel may be provided. In this configuration, stopping of the wheel is achieved by the exciting brake at the switching timing adjusted by the adjusting portion AJ after having inhibited the rotation of the wheel by the regenerative brake. In addition, a configuration including a boosting portion RV configured to boost the power of the power accumulating portion BT to supply the power boosted by the boosting portion RV at the switching timing to the exciting brake adjusted by the adjusting portion AJ to the conversion control portion IV and excite the stator is also applicable.

Figure 2:
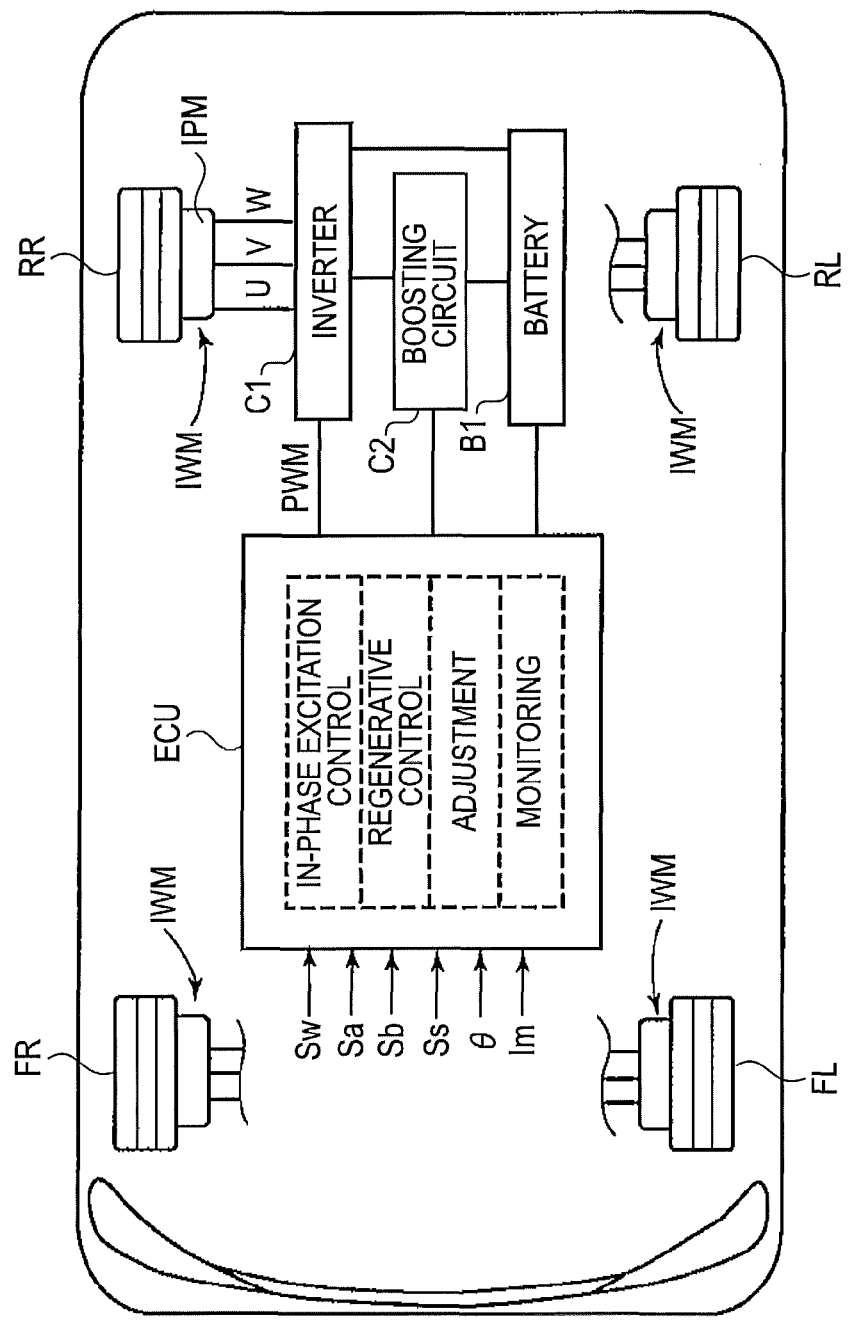
FIG. 2 is a configuration drawing illustrating a vehicle having a braking apparatus of the embodiment disclosed here mounted thereon.

When the braking apparatus configured as described above is mounted on the vehicle, for example, a configuration illustrated in FIG. 2 is achieved. In this embodiment, the in-wheel motor IWM having a motor generator (designated by MG in FIG. 3) using the permanent magnet synchronous motor IPM as portion for performing driving and braking integrated therein is mounted on each of all wheels FL, FR, RL, and RR, and the exciting brake may be applied to each of the wheels by the in-phase excitation control portion PEB as described later. The wheel FL indicates a wheel on the front left, the wheel FR indicates a wheel on the front right, the wheel RL indicates a wheel on the rear left, and the wheel RR indicates a wheel on the rear right when viewed from a driver's seat.

In FIG. 2, a battery B1 as the power accumulating portion BT described above, a boosting circuit C2 as the boosting portion RV, and an inverter C1 as the conversion control portion IV are provided, and these components are controlled by an electronic control unit ECU, so that functions as the in-phase excitation control portion PEB, the regenerative control portion RGB, the adjusting portion AJ, and the power monitoring portion SP described above are executed.

The permanent magnet synchronous motor IPM of this embodiment includes three-phase coils of U, V, and W, and exciting current to the respective phase coils is controlled by the electronic control unit ECU via PWM control or the like, IPM functions as an electric motor when being driven, functions as a power generator at the time of regenerative brake, and is charged into the battery B1 via the inverter C1. A secondary cell is used as the battery B1. However, a power supply portion may be a fuel cell, and a high-capacity capacitor may be used as the power accumulating portion BT. The inverter C1 is configured to convert a DC voltage of the battery B1 into an AC voltage and cause the permanent magnet synchronous motor IPM to output a desired torque, and also convert the AC voltage generated by the permanent magnet synchronous motor IPM at the time of the regenerative brake into a DC voltage and control the converted DC voltage to be charged into the battery B1, and the permanent magnet synchronous motor IPM is controlled by the respective phase coils of U, V, and W.

The wheels FL, FR, RL, and RR are disposed respectively with wheel speed sensors (not illustrated), and these sensors are connected to the electronic control unit ECU, so that a wheel speed signal Sw having a pulse number proportional to the revolving speeds of the respective wheels, that is, the wheel speed is input to the electronic control unit ECU. A resolver signal may be used instead of the wheel speed sensor. An acceleration sensor (not illustrated) configured to output an acceleration signal Sa according to the degree of pressing of an accelerator pedal (not illustrated) by a driver, a brake pedal sensor (not illustrated) configured to output a brake signal Sb according to the degree of pressing of a brake pedal (not illustrated) by a driver, a shift position sensor (not illustrated) configured to output a shift signal Ss according to the shift position of a transmission (not illustrated), a rudder angle sensor (not illustrated) configured to detect the rudder angle θ of the vehicle front wheels FL and FR, and a yaw rate sensor (not illustrated) configured to detect the yaw rate y of the vehicle are connected to the electronic control unit ECU. In addition, a current sensor (not illustrated) configured to detect regenerative currents of the coil of the respective phases U, V, and W (designated by Im as a representative in FIG. 2) as a sensor which constitutes the power monitoring portion SP for a regenerative power monitor is connected to the electronic control unit ECU, where the regenerative power is subjected to arithmetic processing on a steady basis.

The electronic control unit ECU includes a micro computer including a CPU, a ROM, a RAM, and input/output ports connected to each other via buses and is configured in such a manner that the above-described the wheel speed signal Sw, the acceleration signal Sa, the brake signal Sb, the shift signal Ss, the rudder angle θ, and the yaw rate y are input to the CPU from the respective input ports, although not illustrated because the electronic control unit ECU in this embodiment has a general configuration. Control signals are output from the output ports to the inverter C1 or the like. Therefore, the electronic control unit ECU is configured to perform in-phase excitation control that excites the stator in the same phase as the excitation of the stator in the direction of rotation of the rotor being driven and applies an exciting brake, simultaneously, perform regenerative control that accumulates the regenerative power generated in the permanent magnet synchronous motor IPM in the battery B1 and applies the regenerative brake. In this case, the timing of switching from the regenerative brake to the exciting brake is adjusted on the basis of the difference between the regenerative power monitored as described above and the required braking force computed on the basis of the brake signal Sb or the like. In addition, the power boosted via the boosting circuit C2 at the timing of switching to the exciting brake is supplied to the inverter C1 to excite the stator.

Figure 3:
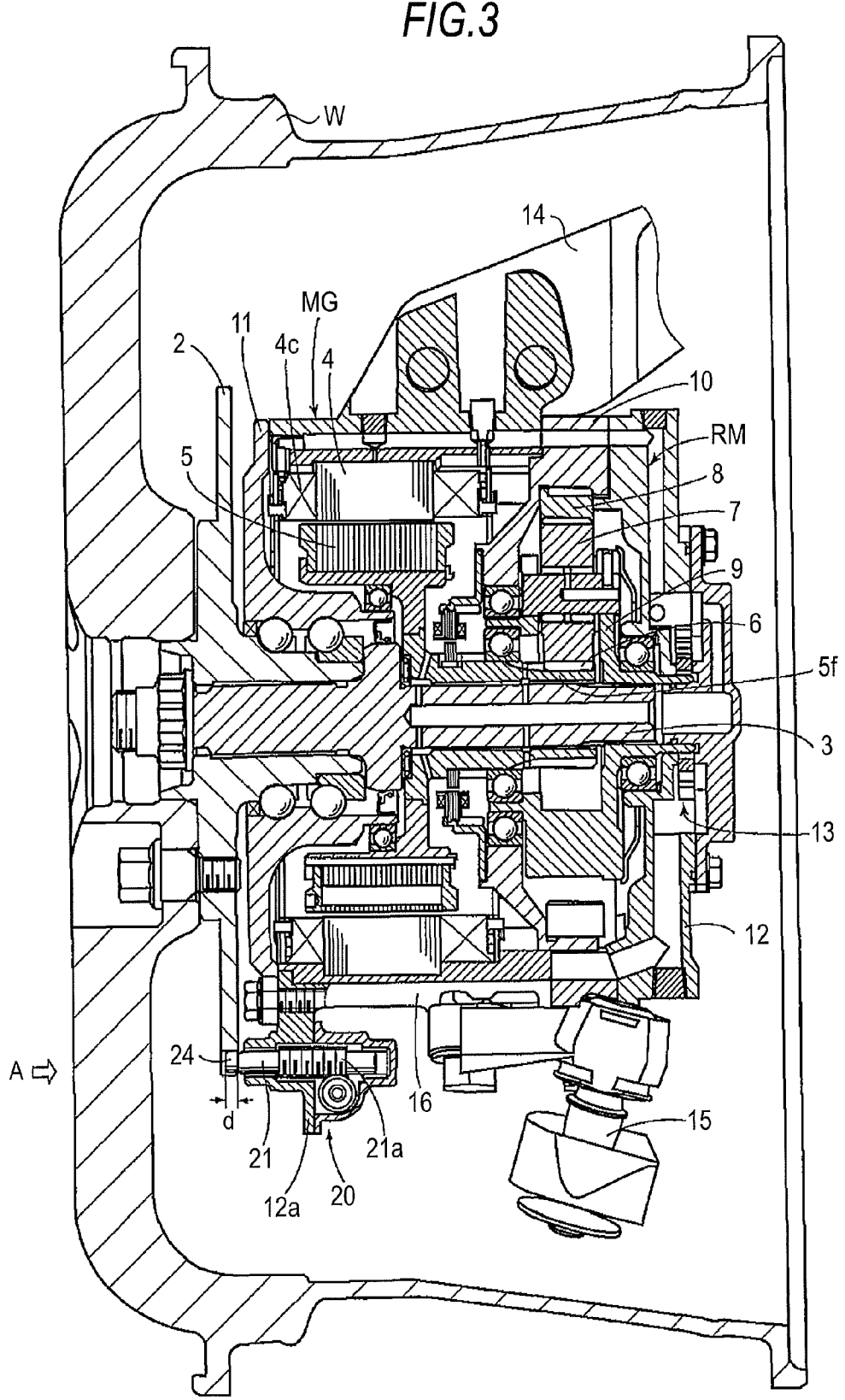
FIG. 3 is a cross-sectional view of a wheel illustrating an embodiment in which this disclosure is applied to an in-wheel motor.
Figure 4:
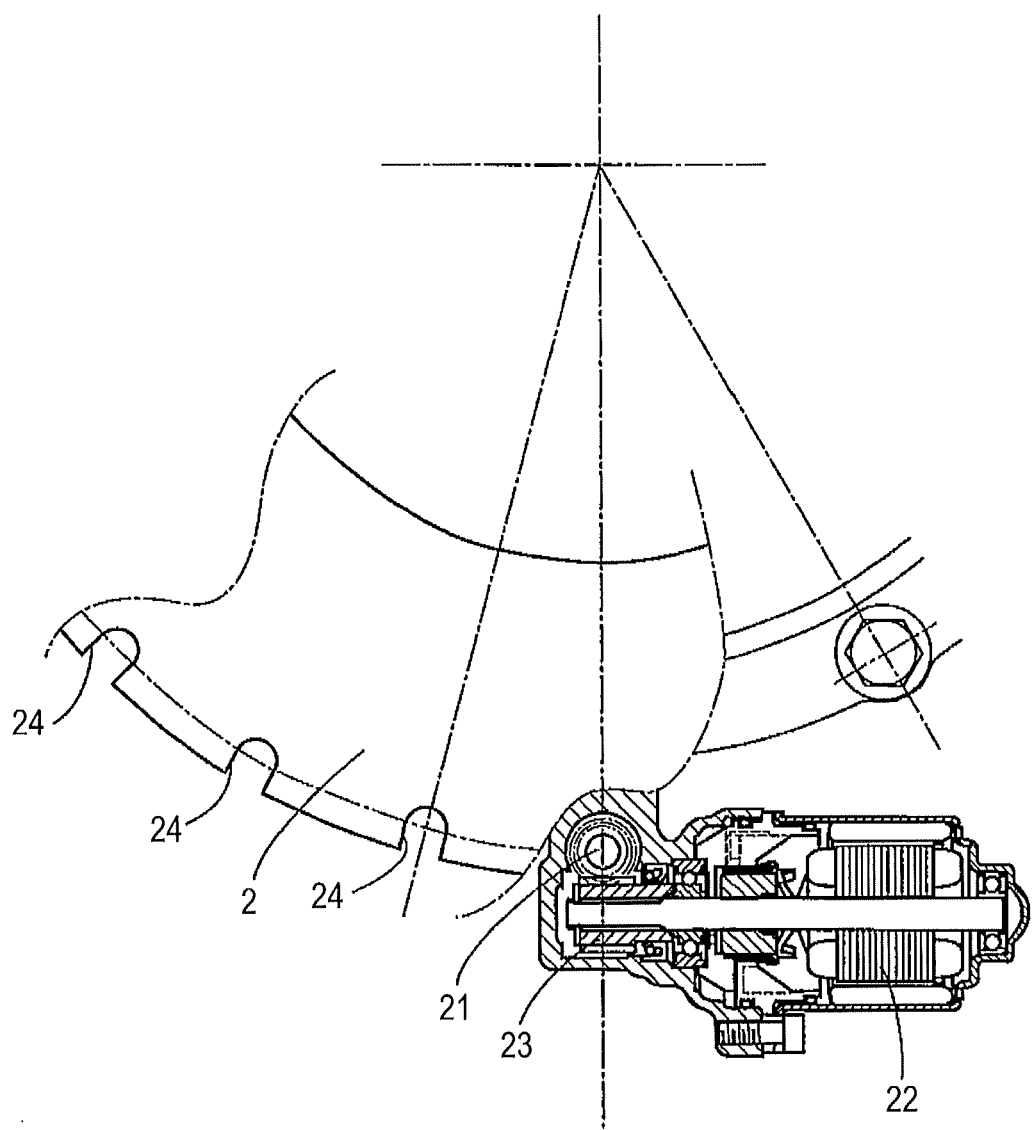
FIG. 4 is a side view of an actuator viewed in a direction indicated by an arrow A in FIG. 3.

Subsequently, a detailed structure of the embodiment in which the permanent magnet synchronous motor IPM is accommodated in the wheel W to constitute the in-wheel motor IWM will be described with reference to FIG. 3 and FIG. 4. FIG. 4 is a side view of an actuator 20 viewed in the direction indicated by an arrow A in FIG. 3. A hub 2 is fixed inside the wheel W which constitutes the wheel, and an output shaft 3 is splined to the hub 2. In FIG. 3, a motor generator MG is exemplified as portion for driving and braking. However, the motor generator MG corresponds to the permanent magnet synchronous motor IPM in FIG. 1, has a coil 4c wound around a stator 4 as a component thereof, and is fixed inside a motor case 16. Then, a rotor 5 in which permanent magnets (designated by 105c in FIG. 7) are embedded therein is disposed inside the stator 4, and is rotatably supported around a center axis of the hub 2.

Furthermore, a flange portion 5f is formed so as to extend from a center of the rotor 5, and a sun gear 6 is mounted thereon. In contrast, a ring gear 8 is fixed inside the motor case 16, and a carrier 9 is mounted on a planetary gear 7 that engages the ring gear 8 and the sun gear 6. Then, the carrier 9 is splined with the output shaft 3 so as to rotate integrally therewith, whereby a planetary gear reduction mechanism RM (hereinafter, referred to simply as reduction mechanism RM) is configured. Therefore, the rotation of the rotor 5 by the motor generator MG is transmitted to the output shaft 3 via the reduction mechanism RM composed of the sun gear 6, the planetary gear 7, and the ring gear 8, and the wheel W is driven and rotated at a reduced speed. In contrast, at the time of deceleration of the vehicle, a rotational force of the wheel W is transmitted to the rotor 5 in the reverse route from the route described above.

An oil pump cover 12 is secured to the motor case 16 via a cover case 11 and a gear case 10, and an oil pump 13 is integrated in the oil pump cover 12. The oil pump 13 is configured to be driven by the above-described carrier 9 and pump up lubricant. The pumped-up lubricant is supplied into an oil channel provided at a center portion of the output shaft 3, the oil pump cover 12, and the motor case 16, and the motor generator MG and the reduction mechanism RM are cooled. The motor case 16 is joined to an upper arm 14 and a lower arm 15 on the outer peripheral portion thereof, and is coupled to a vehicle body (not illustrated) via a suspension (not illustrated).

In this embodiment, the actuator 20 is additionally fixed to a projecting portion of a part in the proximity to the wheel W of the motor case 16. The actuator 20 includes a P shaft 21 as an axially movable member, and is configured to be movable in the axial direction by a gear 23 fixed to a distal end of the output shaft of the compact motor 22 and a gear 21a provided on the P shaft 21. The gear 23 and the gear 21a constitute a worm gear, and a current is supplied to the compact motor 22 by the electronic control unit ECU according to a detection signal indicating the state of the vehicle, and the P shaft 21 is capable of projecting according to the rotation of the compact motor 22. In contrast, a number of depressions (or holes) 24 which are capable of engaging the P shaft 21 are formed on an outer periphery of the above-described hub 2. When the P shaft 21 projects toward the hub in FIG. 3 by a distance (d) by the rotation of the compact motor 22, and engages any one of the depressions 24, the rotation of the hub 2 is inhibited. When a current is supplied to the compact motor 22 in the reverse direction, the P shaft 21 is returned (retracted), and hence the hub 2 is allowed to rotate. Since the worm gear is composed of the gear 23 and the gear 21a as described above, the P shaft 21 is held in that position unless otherwise a current is supplied to the compact motor 22. Therefore, by setting the P shaft 21 to project when a shift lever (not illustrated) is shifted to a parking position (parking position P) and the compact motor 22 is energized, the rotations of the hub 2 and the wheel W may be inhibited.

Figure 5:
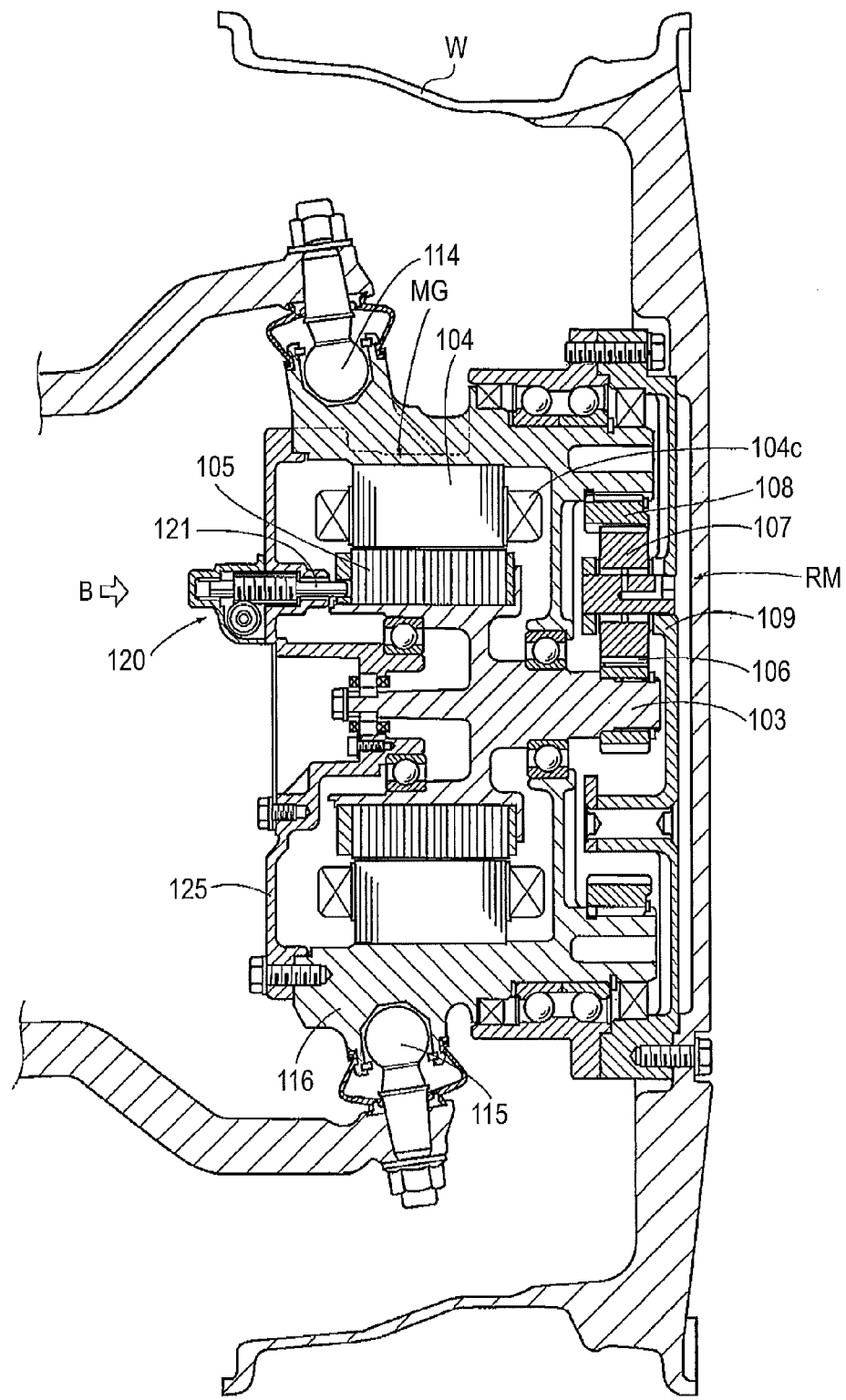
FIG. 5 is a cross-sectional view of the wheel of another embodiment in which this disclosure is applied to the in-wheel monitor.
Figure 6:
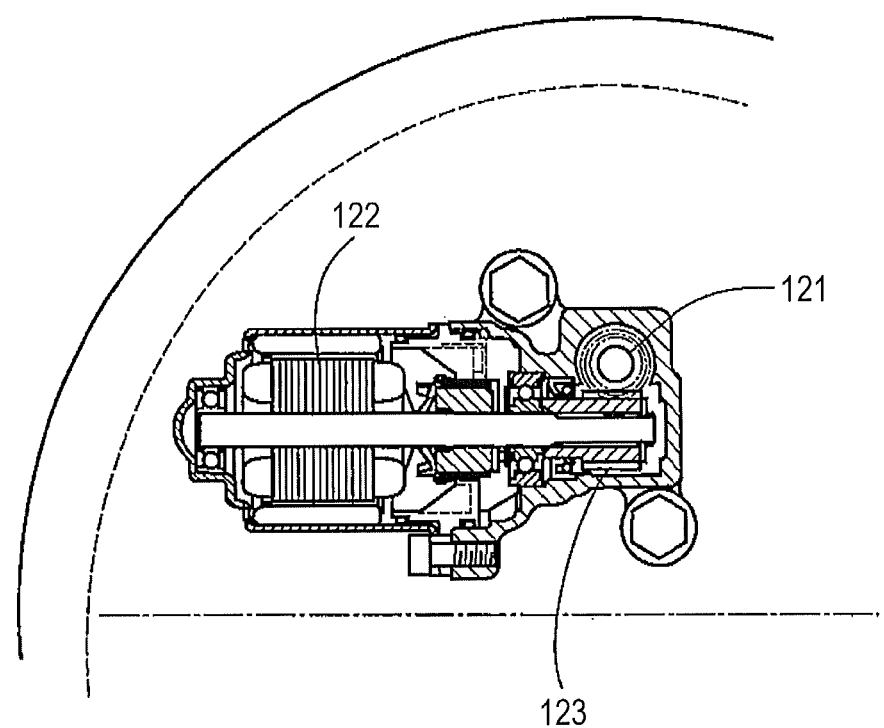
FIG. 6 is a side view of the actuator viewed in a direction indicated by an arrow B in FIG. 5.

Subsequently, a detailed structure of another embodiment in which the permanent magnet synchronous motor IPM is accommodated in the wheel W to constitute the in-wheel motor IWM will be described with reference to FIG. 5, and FIG. 6 illustrating an actuator 120 viewed in a direction indicated by an arrow B in FIG. 5. In order to facilitate the comparison with the embodiment illustrated in FIG. 3, components in FIG. 5 and FIG. 6 which are the same as those in FIG. 3 are designated by numbers adding 100 to numbers in FIG. 3.

As illustrated in FIG. 5, a stator 104 is fixed inside a motor case 116, a rotor 105 is disposed inside thereof, and a sun gear 106 is splined to a distal end of a shaft portion 103 having a flange which supports the rotor 105. A ring gear 108 to which the motor case 116 is fixed and a planetary gear 107 engaging the sun gear 106 are supported by a carrier 109, and an outer flange portion thereof is fixed to the wheel W. A rotational force of the rotor 105 is reduced by the reduction mechanism RM, and the wheel W is driven to rotate. The motor case 116 is coupled to the suspension and the vehicle body (not illustrated) via an upper arm 114 and a lower arm 115.

Furthermore, a cover 125 secured to the motor case 116 is provided with the axial actuator 120, and a P shaft 121 is driven in the direction of axis of rotation of the rotor 105 via worm gears 123 and 121a according to the rotation of a compact motor 122. A distal end of the P shaft 121 is capable of engaging a plurality of holes 106c provided on the rotor 105 and the side plate 105a, and control as the control described above is performed, so that the rotation of the rotor 105 is inhibited and hence the rotation of the wheel W is inhibited. With the provision of a number of the holes 106c in the circumferential direction, the rotation of the wheel W may be inhibited in finer rotational pitches.

Figure 7:
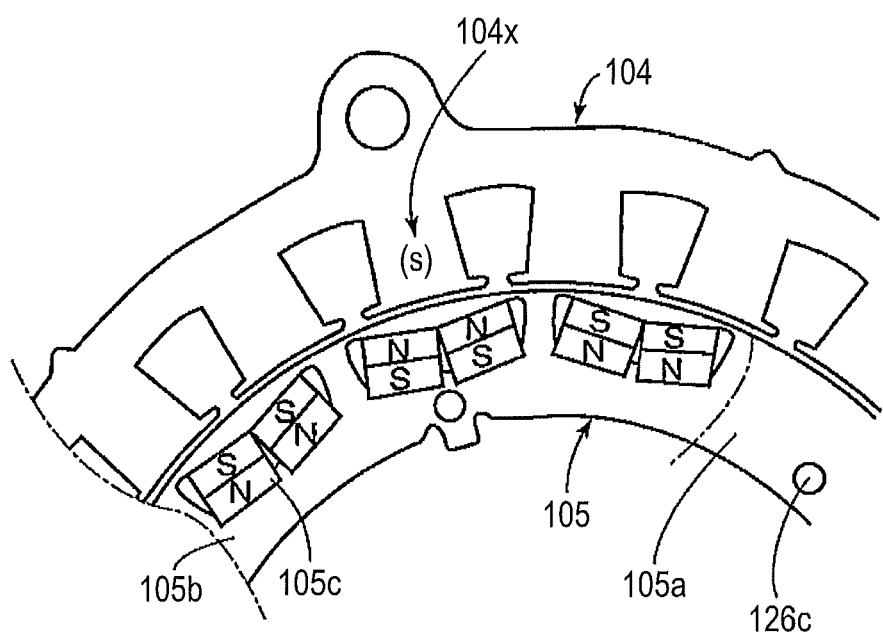
FIG. 7 is a front view illustrating a relationship between a rotor and a stator of an embedded permanent magnet field synchronous motor of the embodiment disclosed here.

FIG. 7 shows a relationship between the magnetic poles of the stator 104 and the rotor 105, in which reference numeral 105a designates the side plate of the rotor 105, and reference numeral 105b designates a laminated plate. When an arbitrary pole of the stator 104 (for example, a stator pole 104x at a center in FIG. 4, in which a winding coil is omitted) is maintained to be an S-pole by energization in a state in which the number of revolutions of the rotor 105 becomes substantially zero, the rotation of the rotor 105 stops at a position where an N-pole of the rotor 105 opposes thereto, and this state (0 control) is maintained while the driver keeps the brake pedal (not illustrated) active. In this manner, the exciting brake control is performed by an electromagnetic force which makes the magnetic pole of the stator 104 to which the magnetic pole embedded in the rotor 105 approaches have opposite polarity from that of the approaching magnetic pole (separating magnetic poles attract one another) and, when the vehicle is stopped, the rotation stop position of the rotor 105 may be set by causing specific poles to oppose each other.

Setting of the rotation stop position described above is performed in the same manner in the embodiment of the configuration in FIG. 3, and the stop position of the hub 2 may be set. In addition, when the shift lever (not illustrated) is shifted to the parking position (parking position P) in the rotation stop position described above, the compact motor 22 (122) is energized, and the P shaft 21 (121) projects by a rotational force thereof and engages the depression 24 or the hole 106c, whereby the stop state of the wheel W (and hence the wheel) is maintained.

Torque characteristics at the time of application of the brake of the motor generator MG constituting the permanent magnet synchronous motor IPM described above and configured to apply the regenerative brake and the exciting brake will be described with reference to FIG. 8. First of all, when the motor generator MG receives a braking command from a vehicle traveling state and is brought into a regenerative control state, the number of revolutions N is reduced while generating a braking torque T as shown by a solid line in FIG. 8 according to the number of revolutions at that time. In other words, the number of revolutions N moves from the constant output area on the right side in FIG. 8 to a constant torque area. Then, when the regenerative control is continued, the number of revolutions N falls below the motor generator MG-specific predetermined number of revolutions (Nc), and when it is determined to be lower than a predetermined torque (Tt−ΔT) obtained by subtracting a predetermined torque difference ΔT from a target braking torque (Tt), which is a target braking force, it is determined to have entered to an exciting brake control area (Bpe). In this manner, the in-phase excitation control is performed by the electronic control unit ECU, and the target braking torque (Tt) is maintained as shown by a solid line in FIG. 8. When the number of revolutions N falls below the predetermined number of revolutions (Nc), the regenerative braking torque T is lowered as shown by a broken line in FIG. 8. Therefore, an active braking force may be estimated on the basis of a regenerative power at that time, and hence the translation to the exciting brake control area (Bpe) may be determined on the basis of the result of detection of the active braking force.

Here, an operation principle of the permanent magnet synchronous motor IPM at the time of the regenerative brake and the exciting brake will be described with reference to FIGS. 11A to 11D. FIGS. 11A to 11D are waveform charts showing the torque characteristics of the permanent magnet synchronous motor IPM, a correlation between the torque and the direction of rotation in association with the phase control of the respective currents of the permanent magnet synchronous motor IPM, and the relationships between the electric rotor angle and the current at the time of driving, at the time of regenerative brake, and at the time of exciting brake. Reference signs U, V, and W in FIGS. 11B to 11D indicate the respective phase currents of the three-shape coils.

Figure 11A:
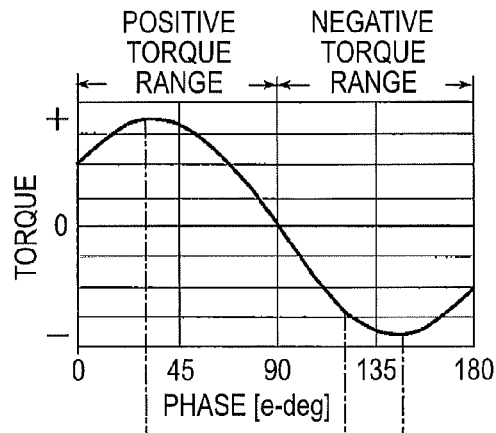
FIGS. 11A to 11D are waveform charts showing torque characteristics of the embedded permanent magnet field synchronous motor, and relationships between the rotor angle and the electric current at the time of respective controls according to the embodiment described here.

FIG. 11A is an example of the torque characteristic of the permanent magnet synchronous motor IPM, showing the relationship between the energizing phase and the output torque upon the passage of the predetermined current, in which a positive torque range and a negative torque range exist. The permanent magnet synchronous motor IPM is set so that s positive torque reaches a peak when the energizing phase is 30 degrees, and a negative torque reaches a peak when the energizing phase is 150 degrees.

Figure 12:
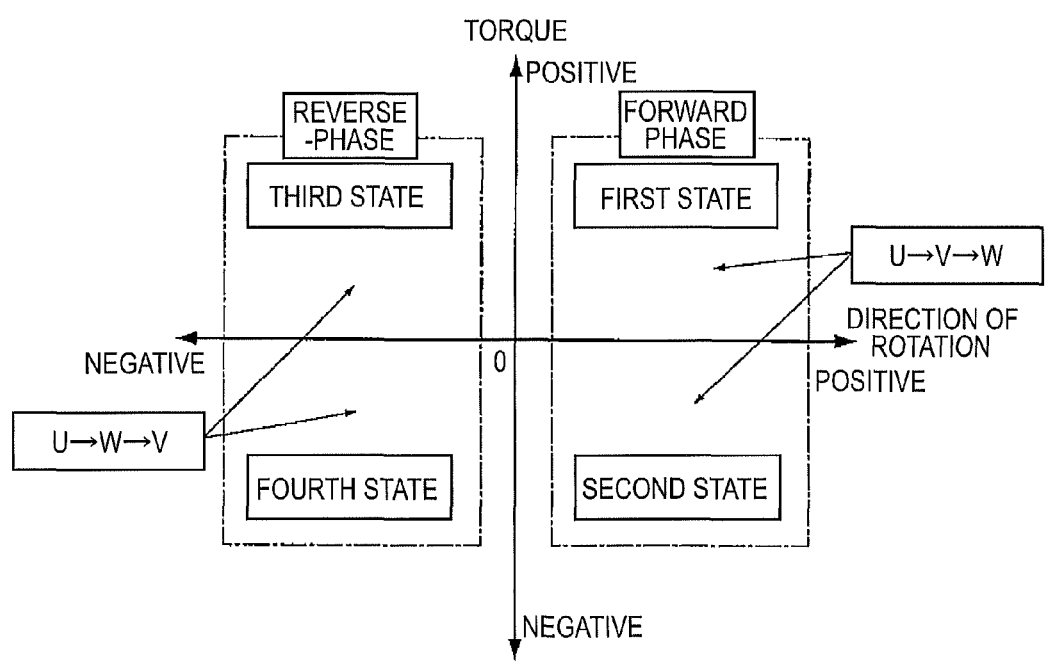
FIG. 12 is a graph showing torque characteristics of the embedded permanent magnet field synchronous motor of the embodiment disclosed here.

As illustrated in FIG. 12, when the direction of rotation of the rotor 5 (or the permanent magnet synchronous motor IPM) is positive, that is, when the wheel rotates forward, the current flows in the order of U, V and W (first energization order pattern) in the permanent magnet synchronous motor IPM. In other words, in the rotor electrical degree, energization is performed so that the peaks of the respective currents appear in the order of U, V, and W. When the positive torque is generated in the permanent magnet synchronous motor IPM (when the torque is generated so as to apply a force in the direction of forward rotation) by this energization, the permanent magnet synchronous motor IPM is brought into a normal-phase driving (first state) which drives the wheel to rotate forward. When the negative torque is generated in the permanent magnet synchronous motor IPM (when the torque is generated so as to hinder a force in the direction of rotation, that is, in the direction of forward rotation), the permanent magnet synchronous motor IPM is brought into a normal-phase braking (second state) which applies the brake to the wheel rotating forward.

In contrast, when the direction of rotation of the rotor 5 (or the permanent magnet synchronous motor IPM) is negative, that is, when the wheel rotates rearward, the order of energization is different from the case where the direction of rotation of the rotor 5 is positive, and the current flows in the order of U, W, and V (second energization order pattern) in the permanent magnet synchronous motor IPM. In other words, in the rotor electrical degree, energization is performed so that the peaks of the respective currents appear in the order of U, W, and V. When the positive torque is generated in the permanent magnet synchronous motor IPM (when the torque is generated so as to apply a force in the direction of rotation, that is, in the direction of rearward rotation), the permanent magnet synchronous motor IPM is brought into a reverse-phase driving (third state) which drives the wheel to rotate rearward. When the negative torque is generated in the permanent magnet synchronous motor IPM (when the torque is generated so as to hinder a force in the direction of rotation, that is, in the direction of rearward rotation), the permanent magnet synchronous motor IPM is brought into a reverse-phase braking (fourth state) which applies the brake to the wheel rotating rearward.

Figure 11B:
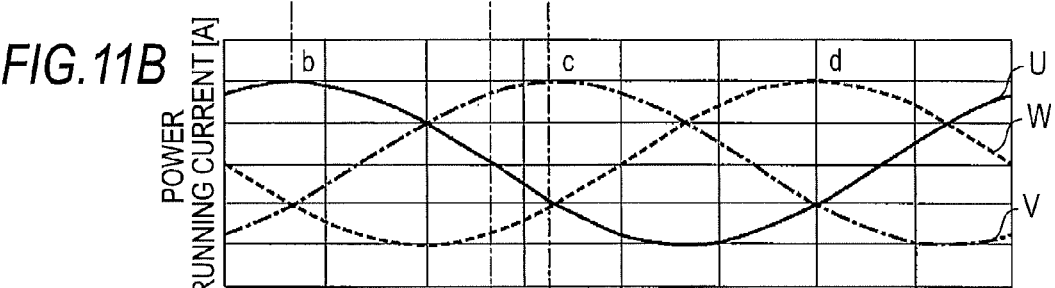

FIG. 11B shows a general relationship between the rotor electrical degree and the drive current at the time of power running (at the time of driving, in particular at the time of forward driving of the vehicle) of the permanent magnet synchronous motor IPM. As illustrated in FIG. 11B, energization to the three-phase coils of the permanent magnet synchronous motor IPM from the battery B1 via the inverter C1 is achieved in the order of U, V, and W. In other words, energization control is performed so that the current value of the U-phase reaches a peak (point b) at a rotor electrical degree of 30 degrees, the current value of the V-phase reaches a peak (point c) at a rotor electrical degree of 150 degrees, and the current value of W-phase reaches a peak (point d) at a rotor electrical degree of 270 degrees.

Also, the torque that the permanent magnet synchronous motor IPM generates by the energization control is determined by setting as needed the point b where the current value of, for example, with reference to the energization of the U-phase from among the U, V, and W phases, the U-phase reaches a peak according to the torque characteristic graph in FIG. 11A. In other words, if the point b where the current of the U-phase reaches a peak is a rotor electrical degree of 30 degrees, the torque reaches a positive peak when the phase is 30 degrees in the torque characteristic graph in FIG. 11A. Therefore, the permanent magnet synchronous motor IPM generates a positive maximum torque by the energization control illustrated in FIG. 11B. Also, for example, if the point b where the current of the U-phase reaches a peak is a rotor electrical degree of 90 degrees, the torque reaches zero when the phase is 90 degrees in the torque characteristic graph in FIG. 11A. Therefore, the torque generated by the permanent magnet synchronous motor IPM in FIG. 11B becomes zero. In other words, by the energization control (the first energization order pattern and the first control) illustrated in FIG. 11B, the permanent magnet synchronous motor IPM takes the first state (normal-phase driving) generating the positive torque (the force which makes an attempt to rotate the wheel in the forward direction) in the rotation in the positive direction (forward direction) as illustrated in FIG. 12.

Figure 11C:
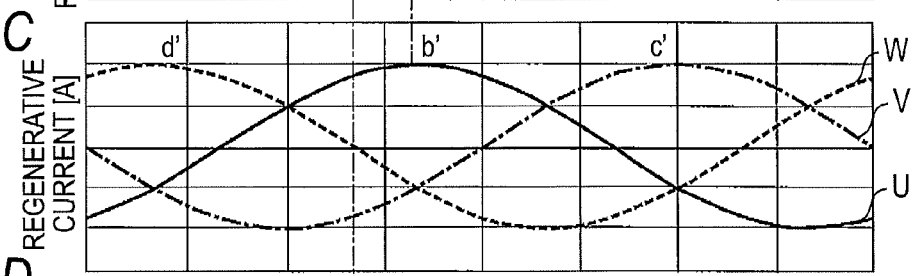

FIG. 11C shows a general relationship between the rotor electrical degree at the time of regeneration of the permanent magnet synchronous motor IPM (specifically, at the time of forward regeneration of the vehicle) and the regenerative current (the current flowing backward from the motor when the motor is activated as a power generator). As illustrated in FIG. 11C, the three-phase coils of the permanent magnet synchronous motor IPM are subjected to the energization control in the order of U, V, and W by the inverter C1, and are charged in the battery B1. In other words, energization control is performed so that the current value of the U-phase reaches a peak (point b') at a rotor electrical degree of 150 degrees, the current value of the V-phase reaches a peak (point c') at a rotor electrical degree of 270 degrees, and the current value of W-phase reaches a peak (point d') at a rotor electrical degree of 390 degrees (30 degrees).

The torque that the permanent magnet synchronous motor IPM generates by the energization control is determined by setting as needed the point b where the current value of, for example, with reference to the energization of the U-phase from among the U, V, and W phases, the U-phase reaches a peak according to the torque characteristic graph in FIG. 11A. In other words, if the point b' where the current of the U-phase reaches a peak is a rotor electrical degree of 150 degrees, the torque reaches a negative peak when the phase is 150 degrees in the torque characteristic graph in FIG. 11A. Therefore, the permanent magnet synchronous motor IPM generates a negative maximum torque by the energization control illustrated in FIG. 11C.

Also, for example, if the point b' where the current of the U-phase reaches a peak is a rotor electrical degree of 90 degrees, the torque reaches zero when the phase is 90 degrees in the torque characteristic graph in FIG. 11A. Therefore, the torque generated by the permanent magnet synchronous motor IPM in FIG. 11B becomes zero. In other words, by the energization control (the first energization order pattern and the second control) illustrated in FIG. 11C, the permanent magnet synchronous motor IPM takes the second state (normal-phase braking) generating the negative torque (the force which makes an attempt to stop the rotating wheel in the forward direction) in the rotation in the positive direction (forward direction) as illustrated in FIG. 12.

Figure 11D:
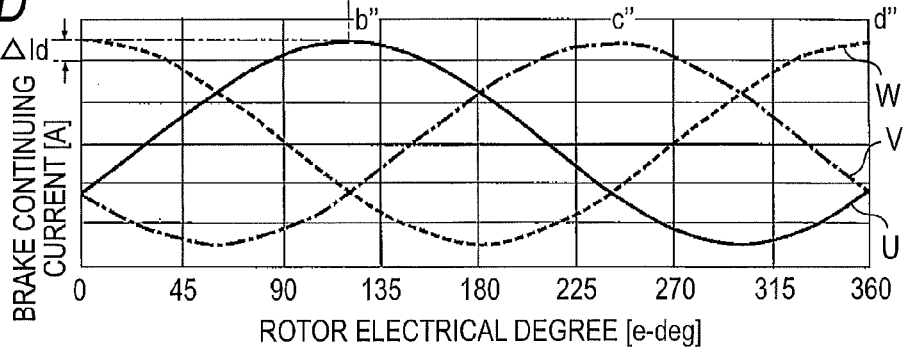

FIG. 11D shows a general relationship between the rotor electrical degree and the drive current at the time of the exciting brake (in particular, at the time of the exciting brake at the time of forward traveling of the vehicle) of the permanent magnet synchronous motor IPM. As illustrated in FIG. 11D, energization to the three-phase coils of the permanent magnet synchronous motor IPM from the battery B1 via the inverter C1 is achieved in the order of U, V, and W. In other words, energization control is performed so that the current value of the U-phase reaches a peak (point b") at a rotor electrical degree of 120 degrees, the current value of the V-phase reaches a peak (point c") at a rotor electrical degree of 240 degrees, and the current value of W-phase reaches a peak (point d") at a rotor electrical degree of 360 degrees.

The torque that the permanent magnet synchronous motor IPM generates by the energization control is determined by setting as needed the point b" where the current value of, for example, with reference to the energization of the U-phase from among the U, V, and W phases, the U-phase reaches a peak according to the torque characteristic graph in FIG. 11A. In other words, if the point b" where the current of the U-phase reaches a peak is a rotor electrical degree of 120 degrees, the torque reaches a negative value when the phase is 120 degrees in the torque characteristic graph in FIG. 11A. Therefore, the permanent magnet synchronous motor IPM generates a negative torque by the energization control illustrated in FIG. 11D.

Also, for example, if the point b where the current of the U-phase reaches a peak is a rotor electrical degree of 90 degrees, the torque reaches zero when the phase is 90 degrees in the torque characteristic graph in FIG. 11A. Therefore, the torque generated by the permanent magnet synchronous motor IPM in FIG. 11D becomes zero. In other words, by the energization control (the first energization order pattern and the second control) illustrated in FIG. 11D, the permanent magnet synchronous motor IPM takes the second state (normal-phase braking) generating the negative torque (the force which makes an attempt to stop the rotating wheel in the forward direction) in the rotation in the positive direction (forward direction) as illustrated in FIG. 12. In other word, the permanent magnet synchronous motor IPM performs the exciting brake (normal-phase braking) which is the same phase as the power running (normal-phase driving).

In particular, at the time of the exciting brake illustrated in FIG. 11D, the boosting circuit C2 boosts to increase ($\Delta$Id) the energizing current to be larger than the energizing current at the time of power running shown in FIG. 11B and achieves a brake continuing current. Accordingly, a braking force (negative torque) larger than the drive force (positive torque) at the time of power running of the permanent magnet synchronous motor IPM may be generated, so that a required braking force is secured by the exciting brake even though the braking force by the regenerative brake is reduced.

Although detailed description of the permanent magnet synchronous motor IPM when the wheel rotates in the reverse direction at the time of power running, at the time of regeneration, and at the time of exciting brake is omitted, as apparent from FIG. 11, the power running, the regeneration and the exciting brakes may be performed by the permanent magnet synchronous motor IPM even at the time of reverse rotation of the wheel by performing the energizing control of the permanent magnet synchronous motor IPM as needed.

Figure 13:
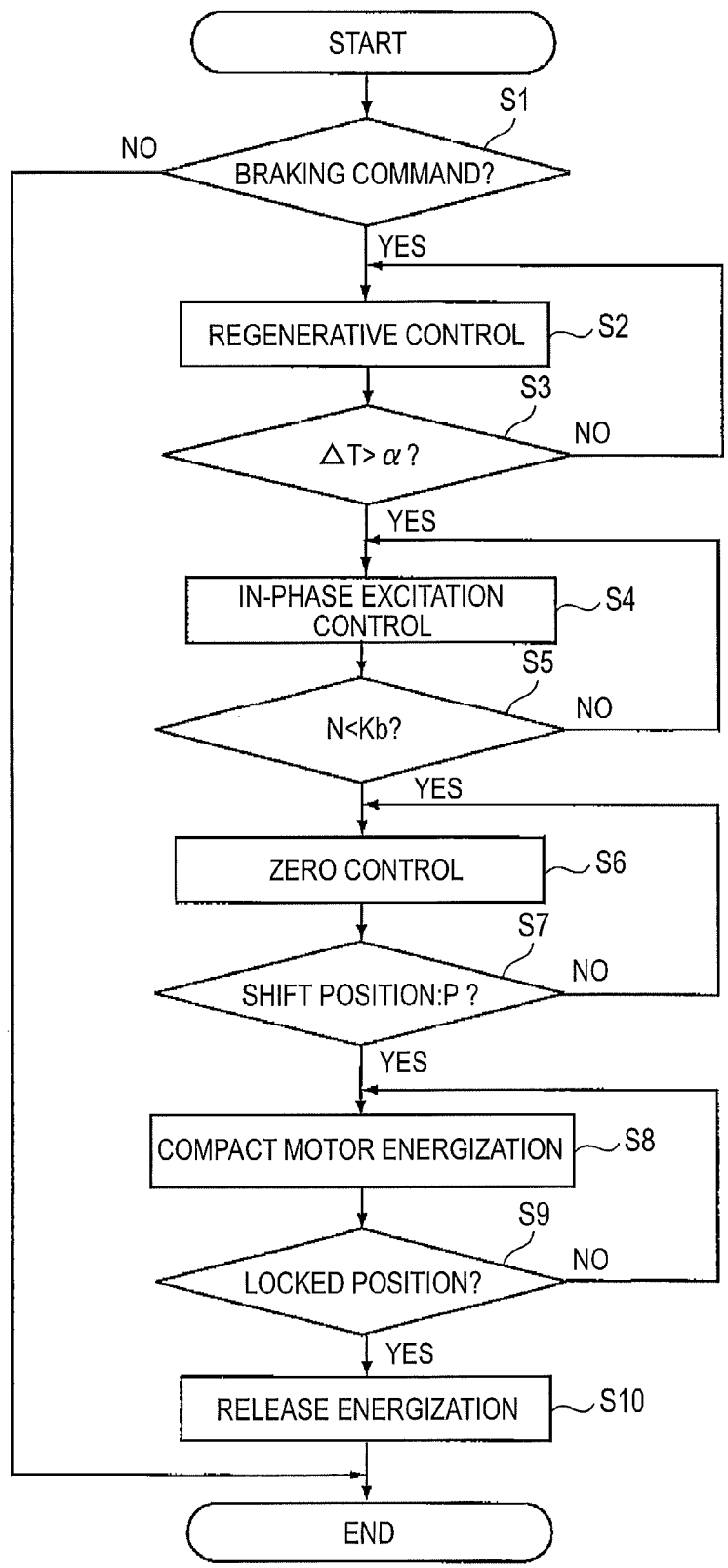
FIG. 13 is a flowchart showing a flow of braking control process of the embodiment disclosed here.

Although the rotation of the wheel W is inhibited by the motor generator MG and the reduction mechanism RM described above and the braking control is performed until the vehicle stops, the example of the braking control will be described below with reference to FIG. 13. Although the description of the drive control by the motor generator MG is omitted, all the controls are executed repeatedly at predetermined time intervals when needed by the electronic control unit ECU in FIG. 2. In FIG. 13, on the basis of the brake signal Sb detected by the brake pedal sensor (not illustrated), a braking command issued by the driver in Step S1 is determined. When it is determined that there is a braking command issued by the driver, the procedure goes to Step S2, where the control is translated to the regenerative control by the motor generator MG, and the regenerative brake is started.

Figure 8:
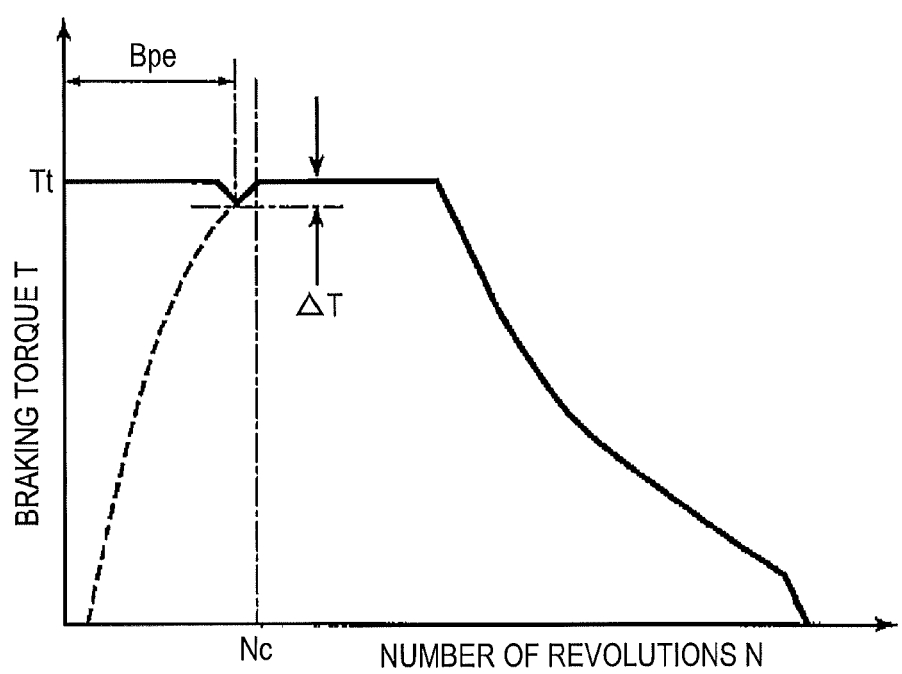
FIG. 8 is a graph showing a relationship between the number of revolutions and the braking torque of the embodiment disclosed here.

In this manner, the number of revolutions is reduced while generating the regenerative brake torque along a solid line in FIG. 8. When the number of revolutions N falls below the predetermined number of revolutions Nc, a magnetomotive force by the motor generator MG is lowered, and the braking torque T as shown by the broken line in FIG. 8 is abruptly lowered and hence cannot satisfy the target braking torque (Tt) only by the regenerative brake torque. In contrast, in this embodiment, when it is determined that the torque falls under the torque (Tt−$\Delta$T) in FIG. 8 and the torque difference ($\Delta$T) exceeds a predetermined value $\alpha$ in Step S3, the target braking force cannot be maintained only by the regenerative brake. Therefore, the procedure goes to Step S4, and the above-described normal-phase excitation control is performed at the time of forward traveling of the vehicle (the reverse-phase excitation control at the time of reverse movement of the vehicle), whereby the exciting brake is started.

Figure 9:
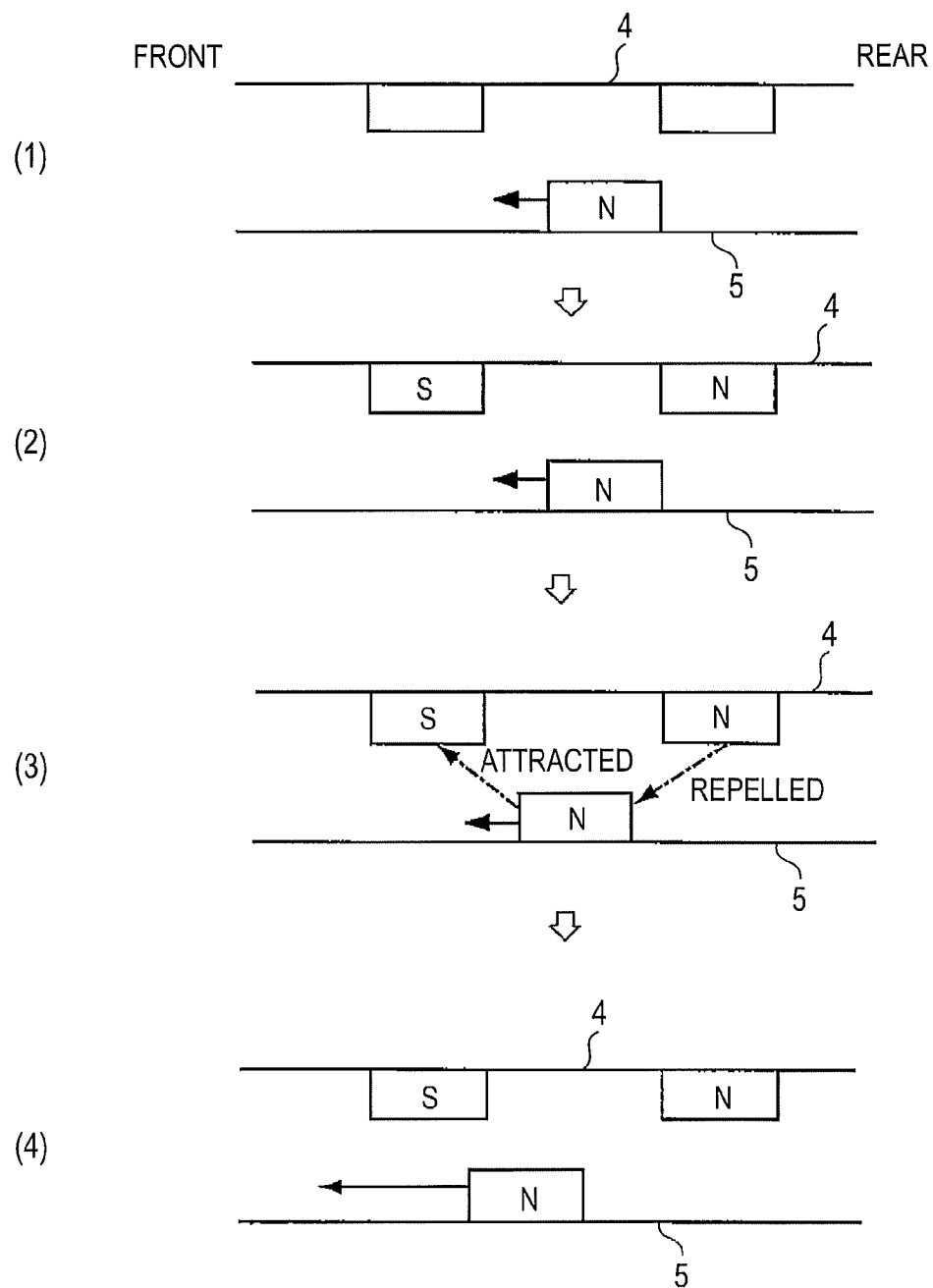
FIG. 9 schematically illustrates side views of relationships between a pole of the rotor and poles of the stator of the embodiment disclosed here.
Figure 10:
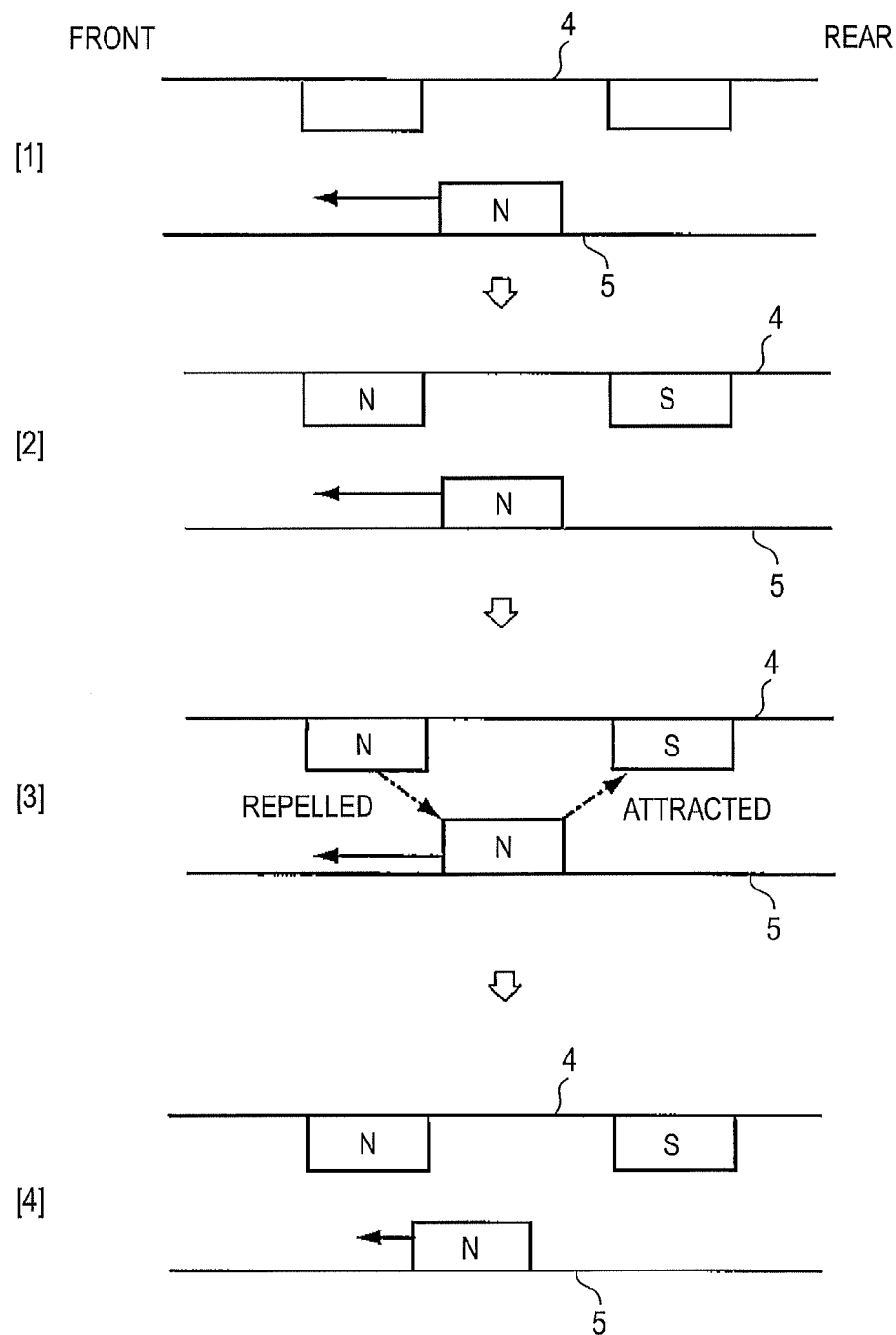
FIG. 10 schematically illustrates side views of the relationships between the pole of the rotor and the poles of the stator of the embodiment disclosed here.

Here, the relationship between the pole of the rotor 5 and the poles of the stator 4 is illustrated schematically in FIG. 9 and FIG. 10, which makes the conditions of acceleration and inhibition of the rotation of the rotor 5 apparent. First of all, in FIG. 9, (1) shows a condition in which the rotor 5 rotates and the pole of the rotor 5 gets close to the position between the both poles of the stator 4 (the pole of the rotor 5 is positioned between the poles of the stator 4 at a position close to the pole of the rotor 5 on the rear side in the direction of rotation), (2) shows a condition in which the pole of the stator 4 on the front side is excited to S and the pole on the rear side to N in the state of (1), (3) shows a condition in which the pole of the rotor 5 is attracted and repelled by the poles of the stator 4, and (4) shows a condition in which the rotation of the rotor 5 is accelerated, respectively. In contrast, in FIG. 10, (1) shows a condition in which the rotor 5 rotates and the pole of the rotor 5 is about to pass between the both poles of the stator 4 (the pole of the rotor 5 is positioned between the poles of the stator 4 at a position close to the pole of the rotor 5 on the front side in the direction of rotation), (2) shows a condition in which the pole of the stator 4 on the front side is excited to N and the pole on the rear side to S in the state of (1), (3) shows a condition in which the pole of the rotor 5 is repelled and attracted by the poles of the stator 4, and (4) shows a condition in which the rotation of the rotor 5 is inhibited, respectively.

As described above, the excitation of the stator 4 is performed prior to the rotation of the rotor 5 in the driven state in FIG. 9, while the rotation of the rotor 5 is performed prior to the excitation, and a braking force larger than the output in the driven state by the boosting circuit C2 at the time of braking in FIG. 10 may be generated, so that a larger braking force may be generated in comparison with the case where the reverse-phase driving disclosed in JP-2004-187445A (Reference 4) described above is applied to the permanent magnet synchronous motor IPM. Also, in the exciting brake, a stable braking force may be obtained by maintaining the state in which the rotation of the rotor 5 is performed prior to the excitation of the stator 4, whereby such a large torque pulsing as the reverse-phase driving may be avoided.

Then, when the number of revolutions N is determined to have fallen below a predetermined value Kb and the vehicle is determined to be in the stop state in Step S5, the procedure goes to Step S6, where the change of the pole of the stator (excitation control) is stopped, and the procedure goes to the O-control described above. Then, after the elapse of a predetermined time period, in Step S7, when the fact that the shift lever (not illustrated) is changed to the parking position (P) on the basis of the shift signal Ss is confirmed, the procedure goes to Steps S8 to S10, where the following locking operation is performed.

First of all, in Step S8, the compact motor (the motor 22 of the actuator 20 illustrated in FIG. 3 and FIG. 4) is energized. Accordingly, the P shaft 21 engages the depression 24 and hence is determined to be in a locked position in Step S9, the procedure goes to Step S10, where the energization with respect to the compact motor 22 is released. From the onward, since the P shaft 21 is maintained at the locked position in which the P shaft 21 engages the depression 24, the stop state of the wheel W (and hence is the wheel) is reliably maintained without consuming the power.

Figure 14:
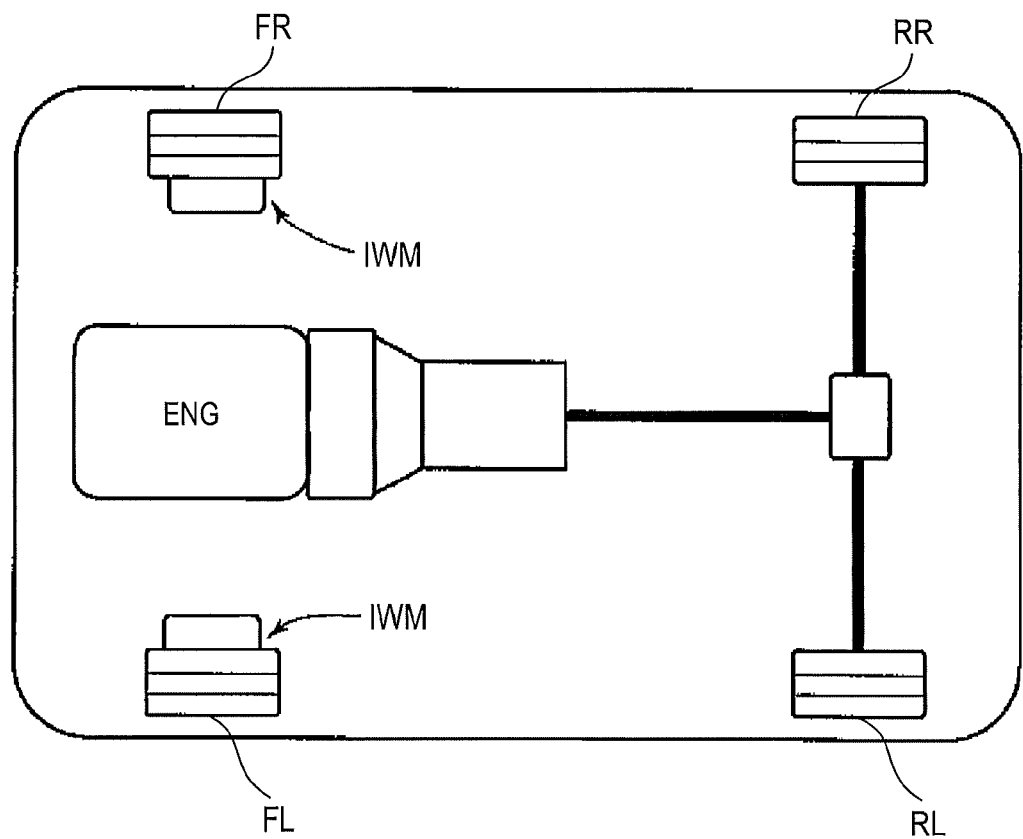
FIG. 14 is a configuration drawing illustrating another form of the vehicle having the braking apparatus of the embodiment disclosed here mounted thereon.

FIG. 14 shows an example of a mode in which any one of the front wheels or the rear wheels of the vehicle is driven by an engine (for example, internal combustion engine) ENG, and the in-wheel motors IWM are mounted on the other wheels. The vehicle in this example employs a rear-wheel drive system and the in-wheel motors IWM capable of the exciting brake described above are mounted on the front wheels. Although not illustrated, it is also applicable to constitute a hybrid motor vehicle with the engine ENG described above and the power accumulating portion BT in FIG. 1 and the power accumulated by the regenerative brake is used for driving the vehicle.

Figure 15:
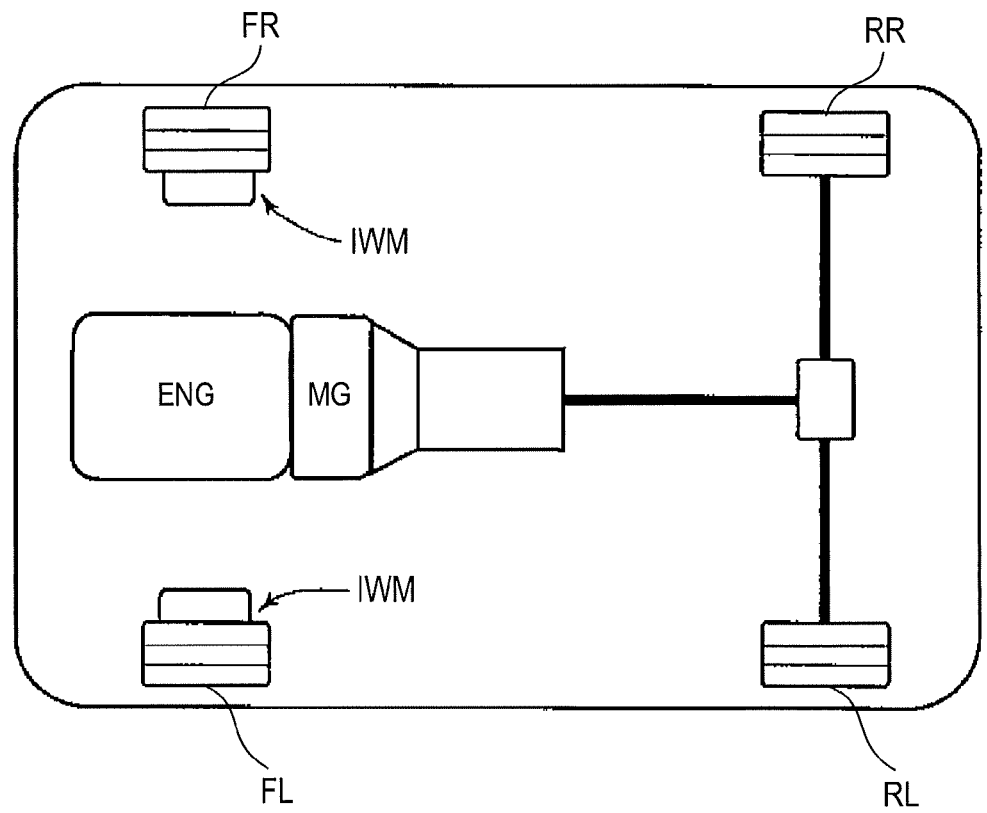
FIG. 15 is a configuration drawing illustrating still another form of the vehicle having the braking apparatus of the embodiment disclosed here mounted thereon.

In FIG. 15, the rear wheels of the vehicle are driven by the engine (for example, internal combustion engine) ENG and/or the motor generator MG, and the in-wheel motors IWM are mounted on the front wheels. Although not illustrated, the hybrid motor vehicle is constituted by the engine ENG described above and the power accumulating portion BT in FIG. 1 and is driven by the in-wheel motors IWM, the engine ENG, and the motor generator MG. In this vehicle, the above-described exciting brake is applied by the motor generator MG and the in-wheel motors IWM. The motor generator MG has a function to start the engine ENG. In addition, a configuration in which the motor generator MG applies the regenerative brake and the power generated by the regenerative brake is supplied to the in-wheel motors IWM to apply the above-described exciting brake is also applicable.

As described above, according to this embodiment, in the braking apparatus for a vehicle including the rotor 5 having the permanent magnet 5c and the stator 4 configured to be capable of driving the rotor 5 to rotate, and being provided with the power accumulating portion BT configured to accumulate power to be supplied to the permanent magnet synchronous motor IPM which couples the rotor 5 to the respective wheels of at least one of a pair of the wheels FR and FL (and/or RR and RL) or at least the left and right wheels FR and FL (and/or RR and RL), and the conversion control portion IV configured to convert the power of the power accumulating portion BT to excite the stator 4 and controls the rotation of the rotor 5, the braking apparatus of the vehicle includes the in-phase excitation control portion PEB configured to excite the stator 4 by supplying the power in the same phase as the excitation with respect to the stator 4 of the direction of rotation (or direction of driving) of the rotor 5 according to the control of the conversion control portion IV and apply the exciting brake with respect to the wheels FR and FL (and/or RR and RL), and configured to stop the wheels FR and FL (and/or RR, RL) by the exciting brake without using the frictional brake equipment.

Alternatively, the braking apparatus for a vehicle includes the permanent magnet synchronous motor IPM including the rotor 5 integrally rotatable with the wheel (any one of FR, FL, RR and RL) and the stator 4 capable of driving the rotor 5 to rotate and configured to receive a supply of power from the battery B1 and the conversion control portion IV configured to control the power supplied from the battery B1 to the permanent magnet synchronous motor IPM and control the rotation of the permanent magnet synchronous motor IPM, the conversion control portion IV controls the energization of the electric motor to be the first energization order pattern (the order of U, V, and W) in the rotation of the permanent magnet synchronous motor IPM in one direction (rotation in the forward direction in this embodiment), controls the energization of the permanent magnet synchronous motor IPM to be the second energization order pattern (the order of U, W, and V) in the rotation of the permanent magnet synchronous motor IPM in the other direction (the rearward rotation in this embodiment), and is capable of performing the first control which causes the torque to be generated so as to apply a force to the permanent magnet synchronous motor IPM in the direction of rotation thereof and the second control which causes the torque to be generated so as to prevent the force of the permanent magnet synchronous motor IPM in the direction of rotation thereof in the first and second energization order patterns respectively when supplying the power from the battery B1 to the permanent magnet synchronous motor IPM, includes the in-phase excitation control portion PEB configured to inhibit the rotation of the rotor 5 and apply the exciting brake on the wheel by performing the second control in the first and second energization order patterns, respective when supplying the power from the battery B1 to the permanent magnet synchronous motor IPM, and stops the wheel (any one of FR, FL, RR, and RL) by the exciting brake without using the frictional brake equipment.

According to the braking apparatus of the embodiment disclosed here, with the exciting brake applied by the permanent magnet synchronous motor IPM, the rotation of the wheel may be inhibited only by the control performed by the permanent magnet synchronous motor IPM without the necessity of the frictional brake equipment, and a braking force may be applied smoothly and reliably until the wheel is brought into the stop state. Therefore, the frictional brake equipment may be eliminated from the wheel, reduction in size and weight of the entire braking apparatus is enabled and hence reduction in diameter of the wheel is achieved, and enlargement of the cabin space is enabled. In addition, fuel efficiency is also improved.

In particular, in the in-wheel motor IWM, the unsprung weight may be reduced by eliminating the frictional brake equipment from the wheel and hence from the wheel, so that the commercial viability of the in-wheel motor IWM is further ensured.

Furthermore, the regenerative control portion RGB configured to accumulate the regenerative power generated in the permanent magnet synchronous motor IPM in the power accumulating portion BT via the conversion control portion IV by the rotations of the wheels FR, FL, RR, and RL and apply the regenerative brake to the wheels FR, FL, RR, and RL is provided, so that the rotations of the wheels FR, FL, RR, and RL are inhibited by the regenerative brake, and the wheels FR, FL, RR, and RL are stopped by the exciting brake. Therefore, since the regenerative power may be utilized to inhibit the rotation of the wheels FR, FL, RR, and RL by the regenerative brake and cause the wheels FR, FL, RR, and RL to stop reliably by the exciting brake, effective energy utilization is achieved.

As illustrated in FIG. 2, at least the rotor 5 and the stator 4 which constitute the permanent magnet synchronous motor IPM are accommodated in the wheel W which constitutes the wheels FR, FL, RR, or RL to constitute the in-wheel motor IWM. Accordingly, further reduction in size and weight of the entire braking apparatus is enabled. As illustrated in FIG. 2, the permanent magnet synchronous motor IPM is mounted for each of all the wheels FR, FL, RR, and RL of the vehicle to apply the exciting brake to each of the wheel by the in-phase excitation control portion PEB. Accordingly, since the exciting brake may be applied to each of all the wheels FR, FL, RR, and RL, operation control of the vehicle by complex braking force control is facilitated.

In addition, the power monitoring portion SP configured to monitor the regenerative power and the adjusting portion AJ configured to adjust the switching timing from the regenerative brake applied by the regenerative control portion SP to the exciting brake applied by the in-phase excitation control portion PEB on the basis of the difference between the regenerative power detected by the power monitoring portion SP and the required braking force for the wheels FR, FL, RR, and RL are provided, and the wheels FR, FL, RR, and RL are stopped by the exciting brake at the switching timing adjusted by the adjusting portion AJ after the rotations of the wheels FR, FL, RR, and RL are inhibited by the regenerative brake. Accordingly, stopping of the wheel is achieved by the exciting brake at an adequate switching timing after the rotation of the wheel has been inhibited by the regenerative brake.

Alternatively, with a configuration including the boosting portion RV configured to boost the power of the power accumulating portion BT to supply the power boosted by the boosting portion RV to the conversion control portion IV and excite the stator 4 at the switching timing to the exciting brake adjusted by the adjusting portion AJ, a large braking force may be secured by the exciting brake, so that the operation control of the vehicle is facilitated.

In addition, with the configuration of the permanent magnet synchronous motor IPM driving the wheels, driving and braking of the wheels FR, FL, RR, and RL is also enabled by the permanent magnet synchronous motor IPM, so that reduction in number of components and reduction in size are achieved in the vehicle.

Although the permanent magnet synchronous motor IPM has been described as having a function to drive and apply the exciting brake to the wheels FR, FL, RR, and RL of the embodiment disclosed here, a configuration in which the permanent magnet synchronous motor IPM does not drive the wheels and performs only the exciting brake is also applicable.

[FIG. 1]
AJ ADJUSTING PORTION
BT POWER ACCUMULATING PORTION
RGB REGENERATIVE CONTROL PORTION
IV CONVERSION CONTROL PORTION
SP MONITORING
RV BOOSTING PORTION
PEB IN-PHASE EXCITATION CONTROL PORTION
REGENERATIVE BRAKE
EXCITING BRAKE
IPM PERMANENT MAGNET SYNCHRONOUS MOTOR
STATOR
ROTOR
W WHEEL
[FIG. 2]
IN-PHASE EXCITATION CONTROL
REGENERATIVE CONTROL
ADJUSTMENT
MONITORING
C1 INVERTER
C2 BOOSTING CIRCUIT
B1 BATTERY
[FIG. 8]
BRAKING TORQUE T
NUMBER OF REVOLUTIONS N
[FIG. 9]
FRONT
REAR
ATTRACTED
REPELLED
[FIG. 10]
FRONT
REAR
REPELLED
ATTRACTED
[FIG. 11A]
POSITIVE TORQUE RANGE
NEGATIVE TORQUE RANGE

TORQUE
PHASE
[FIG. 11B]
POWER RUNNING CURRENT
[FIG. 11C]
REGENERATIVE CURRENT
[FIG. 11D]
BRAKE CONTINUING CURRENT
ROTOR ELECTRICAL DEGREE [e-deg]
[FIG. 12]
TORQUE
POSITIVE
POSITIVE
NEGATIVE
NEGATIVE
REVERSE-PHASE
FORWARD PHASE
FIRST STATE
SECOND STATE
THIRD STATE
FOURTH STATE
DIRECTION OF ROTATION
[FIG. 13]
START
S1 BRAKING COMMAND?
S2 REGENERATIVE CONTROL
S4 IN-PHASE EXCITATION CONTROL
S6 ZERO CONTROL
S7 SHIFT POSITION:P?
S8 COMPACT MOTOR ENERGIZATION
S9 LOCKED POSITION?
S10 RELEASE ENERGIZATION
END

What is claimed is:

1. A braking apparatus for a vehicle comprising:
a permanent magnet synchronous motor including a rotor having a permanent magnet, and a stator capable of driving the rotor to rotate and configured to couple the rotor to each of at least a pair of wheels of the vehicle;
a power accumulating portion configured to accumulate power to be supplied to the permanent magnet synchronous motor;
a conversion control portion configured to convert the power of the power accumulating portion to excite the stator and control the rotation of the rotor; and
an in-phase excitation control portion configured to apply exciting brake to the wheel by exciting the stator by supplying power in the same phase as the excitation with respect to the stator in the direction of rotation of the rotor according to the control performed by the conversion control portion, wherein the wheel is stopped by the exciting brake.

2. The braking apparatus for a vehicle according to claim 1, comprising:
a regenerative control portion configured to accumulate a regenerative power generated in the permanent magnet synchronous motor by the rotation of the wheel in the power accumulating portion via the conversion control portion and apply a regenerative brake to the wheel,
wherein the rotation of the wheel is inhibited by the regenerative brake and the wheel is stopped by the exciting brake.

3. The braking apparatus for a vehicle according to claim 1, wherein at least the rotor and the stator which constitute the permanent magnet synchronous motor are accommodated in a wheel which constitutes the wheel to constitute an in-wheel motor.

4. The braking apparatus for a vehicle according to claim 1, wherein the permanent magnet synchronous motor is mounted on each one of all the wheels of the vehicle, and the exciting brake is applied to each of the wheels by the in-phase excitation control portion.

5. The braking apparatus for a vehicle according to claim 1, comprising:
a power monitoring portion configured to monitor the regenerative power; and
an adjusting portion configured to adjust a switching timing from the regenerative brake applied by the regenerative control portion to the exciting brake applied by the in-phase excitation control portion on the basis of the difference between the regenerative power detected by the power monitoring portion and the required braking force with respect to the wheel,
wherein the wheel is stopped by the exciting brake at the switching timing adjusted by the adjusting portion after the inhibition of the rotation of the wheel by the regenerative brake.

6. The braking apparatus for a vehicle according to claim 5, comprising:
a boosting portion configured to boost the power of the power accumulating portion,
wherein the power boosted by the boosting portion is supplied to the conversion control portion to excite the stator at the switching timing to the exciting brake adjusted by the adjusting portion.

7. The braking apparatus for a vehicle according to claim 1, wherein the permanent magnet synchronous motor is configured to drive the wheel.

8. A braking apparatus for a vehicle comprising:
an electric motor including a rotor integrally rotatable with a wheel; and a stator capable of driving the rotor to rotate and configured to receive a supply of power from a power supply portion; and
a control portion configured to control the power supplied from the power supply portion to the electric motor and control the rotation of the electric motor,
wherein the control portion controls the energization of the electric motor to be a first energization order pattern in the rotation of the electric motor in one direction, controls the energization of the the electric motor to be a second energization order pattern in the rotation of the electric motor in the other direction, is capable of performing a first control which causes the torque to be generated so as to apply a force to the electric motor in the direction of rotation thereof and the second control which causes the torque to be generated so as to prevent the force of the electric motor in in the direction of rotation thereof in the first and second energization order patterns respectively when supplying the power from the power supply portion to the electric motor, and includes an exciting portion configured to inhibit the rotation of the rotor and apply the exciting brake to the wheel by performing the second control in the first and second energization order patterns respectively when supplying the power from the power supply portion to the electric motor.

9. The braking apparatus for a vehicle according to claim 8, comprising:
a regenerative control portion configured to accumulate a regenerative power generated in the electric motor by the rotation of the wheel in the power supply portion via the control portion and apply a regenerative brake to the wheel, wherein the rotation of the wheel is inhibited by the regenerative brake and the wheel is stopped by the exciting brake.

10. The braking apparatus for a vehicle according to claim 8,
wherein at least the rotor and the stator which constitute the electric motor are accommodated in a wheel which constitutes the wheel to constitute an in-wheel motor.

11. The braking apparatus for a vehicle according to claim 8,
wherein the electric motor is mounted on each one of all the wheels of the vehicle, and the exciting brake is applied to each of the wheels by the excitation control portion.

12. The braking apparatus for a vehicle according to claim 8, comprising:
a power monitoring portion configured to monitor the regenerative power; and
an adjusting portion configured to adjust a switching timing from the regenerative brake applied by the regenerative control portion to the exciting brake applied by the in-phase excitation control portion on the basis of the difference between the regenerative power detected by the power monitoring portion and the required braking force with respect to the wheel,
wherein the wheel is stopped by the exciting brake at the switching timing adjusted by the adjusting portion after the inhibition of the rotation of the wheel by the regenerative brake.

13. The braking apparatus for a vehicle according to claim 12, comprising:
a boosting portion configured to boost the voltage of the power supply portion,
wherein the power boosted by the boosting portion is supplied to the conversion control portion to excite the stator at the switching timing to the exciting brake adjusted by the adjusting portion.

14. The braking apparatus for a vehicle according to claim 8, wherein the electric motor is configured to drive the wheel.

* * * * *